(12) United States Patent
Geng et al.

(10) Patent No.: US 11,726,365 B1
(45) Date of Patent: Aug. 15, 2023

(54) OPTICAL ASSEMBLY FOR PROVIDING KOEHLLER ILLUMINATION TO A DISPLAY

(71) Applicant: META PLATFORMS TECHNOLOGIES, LLC, Menlo Park, CA (US)

(72) Inventors: Ying Geng, Bellevue, WA (US); Weichuan Gao, Redmond, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 352 days.

(21) Appl. No.: 16/926,444

(22) Filed: Jul. 10, 2020

(51) Int. Cl.
| | |
|---|---|
| *G02B 27/01* | (2006.01) |
| *G02B 27/00* | (2006.01) |
| *G02F 1/13357* | (2006.01) |
| *G02B 27/28* | (2006.01) |
| *G02F 1/1335* | (2006.01) |

(52) U.S. Cl.
CPC ..... *G02F 1/13362* (2013.01); *G02B 27/0172* (2013.01); *G02B 27/0176* (2013.01); *G02B 27/283* (2013.01); *G02B 2027/015* (2013.01); *G02F 1/133616* (2021.01)

(58) Field of Classification Search
CPC ........... G02F 1/13362; G02F 1/133616; G02B 27/0172; G02B 27/0176; G02B 27/283; G02B 2027/015
USPC ....................................................... 359/485
See application file for complete search history.

(56) References Cited

U.S. PATENT DOCUMENTS

| | | |
|---|---|---|
| 2006/0077522 A1 | 4/2006 | Kothari |
| 2013/0242392 A1 | 9/2013 | Amirparviz et al. |
| 2014/0293189 A1 | 10/2014 | Fukunaga et al. |
| 2016/0208999 A1 | 7/2016 | Jurik |
| 2018/0048880 A1 | 2/2018 | Trail et al. |
| 2018/0067315 A1 | 3/2018 | Amitai et al. |

(Continued)

FOREIGN PATENT DOCUMENTS

CN     110068927 A     7/2019

OTHER PUBLICATIONS

Non-Final Office Action dated Apr. 1, 2022 for U.S. Appl. No. 16/920,208, filed Jul. 2, 2020, 16 pages.

(Continued)

*Primary Examiner* — Collin X Beatty
*Assistant Examiner* — Grant A Gagnon
(74) *Attorney, Agent, or Firm* — Morgan, Lewis & Bockius LLP

(57) ABSTRACT

An illumination assembly includes one or more light sources and an optical assembly. The one or more light sources is configured to provide illumination light. The optical assembly includes a first optical component, a second optical component, and a third optical component. The first optical component, the second optical component, and the third optical component are positioned so that the illumination light is (i) received by the first optical component, (ii) transmitted through the first optical component toward the second optical component, (iii) reflected at the second optical component toward the third optical component, (iv) reflected at the third optical component toward the second optical component, and (v) transmitted through the second optical component. A method of providing illumination using an optical assembly is also disclosed.

18 Claims, 18 Drawing Sheets

(56) References Cited

U.S. PATENT DOCUMENTS

| | | |
|---|---|---|
| 2018/0284585 A1 | 10/2018 | Trisnadi et al. |
| 2019/0041642 A1* | 2/2019 | Haddick ............ G02B 27/0075 |
| 2019/0171005 A1 | 6/2019 | Lee et al. |
| 2019/0179149 A1 | 6/2019 | Curtis et al. |
| 2020/0209667 A1 | 7/2020 | Sharlin et al. |
| 2020/0249480 A1 | 8/2020 | Martinez et al. |

OTHER PUBLICATIONS

Notice of Allowance dated Aug. 10, 2022 for U.S. Appl. No. 16/920,202, filed Jul. 2, 2020, 10 pages.

Notice of Allowance dated Sep. 13, 2022 for U.S. Appl. No. 16/920,208, filed Jul. 2, 2020, 6 pages.

Notice of Allowance dated Jul. 18, 2022 for U.S. Appl. No. 16/920,208, filed Jul. 2, 2020, 5 pages.

Notice of Allowance dated Aug. 24, 2022 for U.S. Appl. No. 16/920,202, filed Jul. 2, 2020, 2 pages.

Berberova N., et al., "Polarization Holographic Recording in Thin Films of Pure Azopolymer and Azopolymer Based Hybrid Materials," Optical Materials, Feb. 2017, vol. 64, pp. 212-216.

Non-Final Office Action dated Jan. 19, 2023 for U.S. Appl. No. 16/920,195, filed Jul. 2, 2020, 23 pages.

Notice of Allowance dated Oct. 28, 2022 for U.S. Appl. No. 16/920,202, filed Jul. 2, 2020, 2 pages.

Notice of Allowance dated Nov. 3, 2022 for U.S. Appl. No. 16/920,208, filed Jul. 2, 2020, 2 pages.

Notice of Allowance dated Nov. 30, 2022 for U.S. Appl. No. 16/920,208, filed Jul. 2, 2020, 2 pages.

* cited by examiner

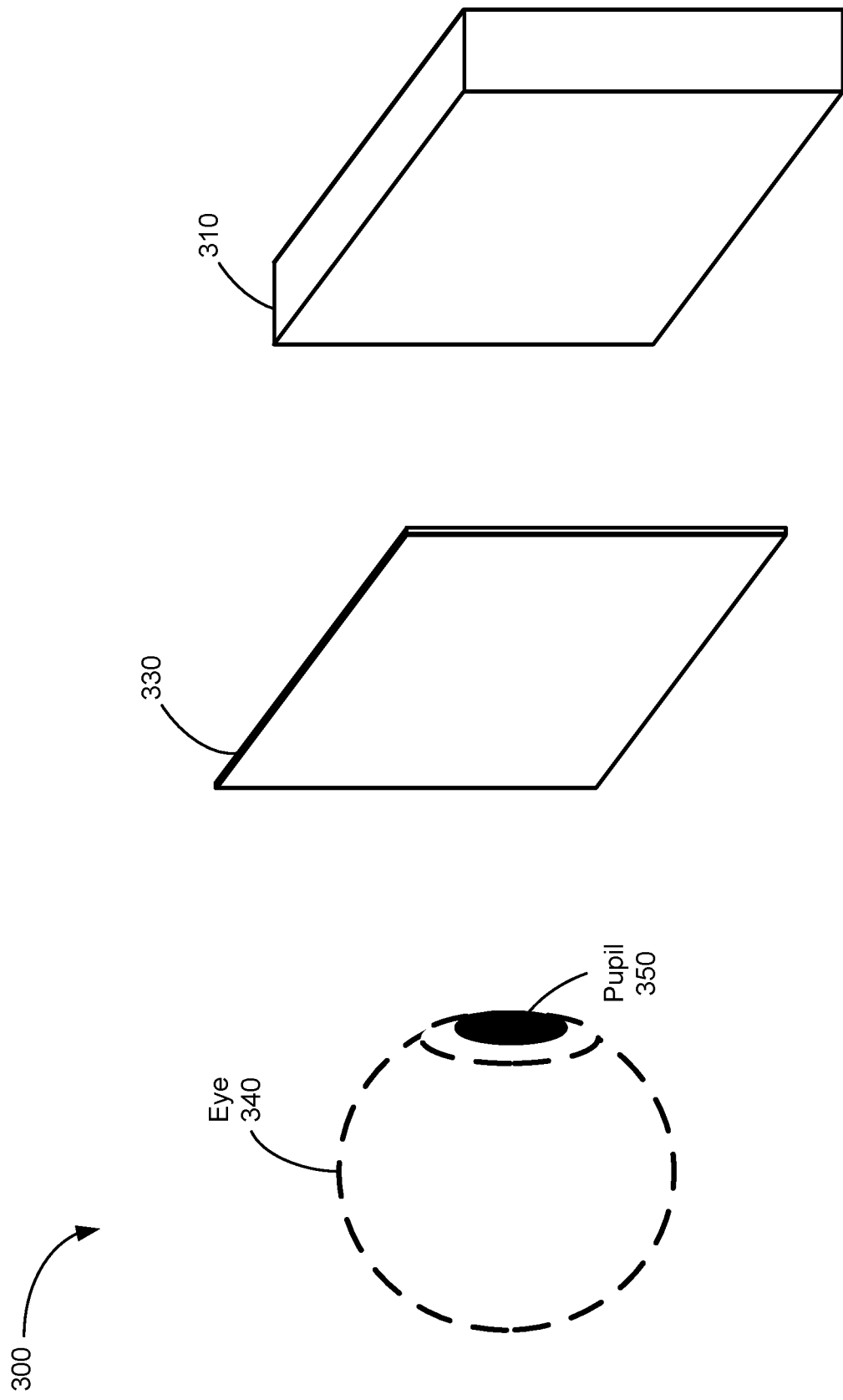

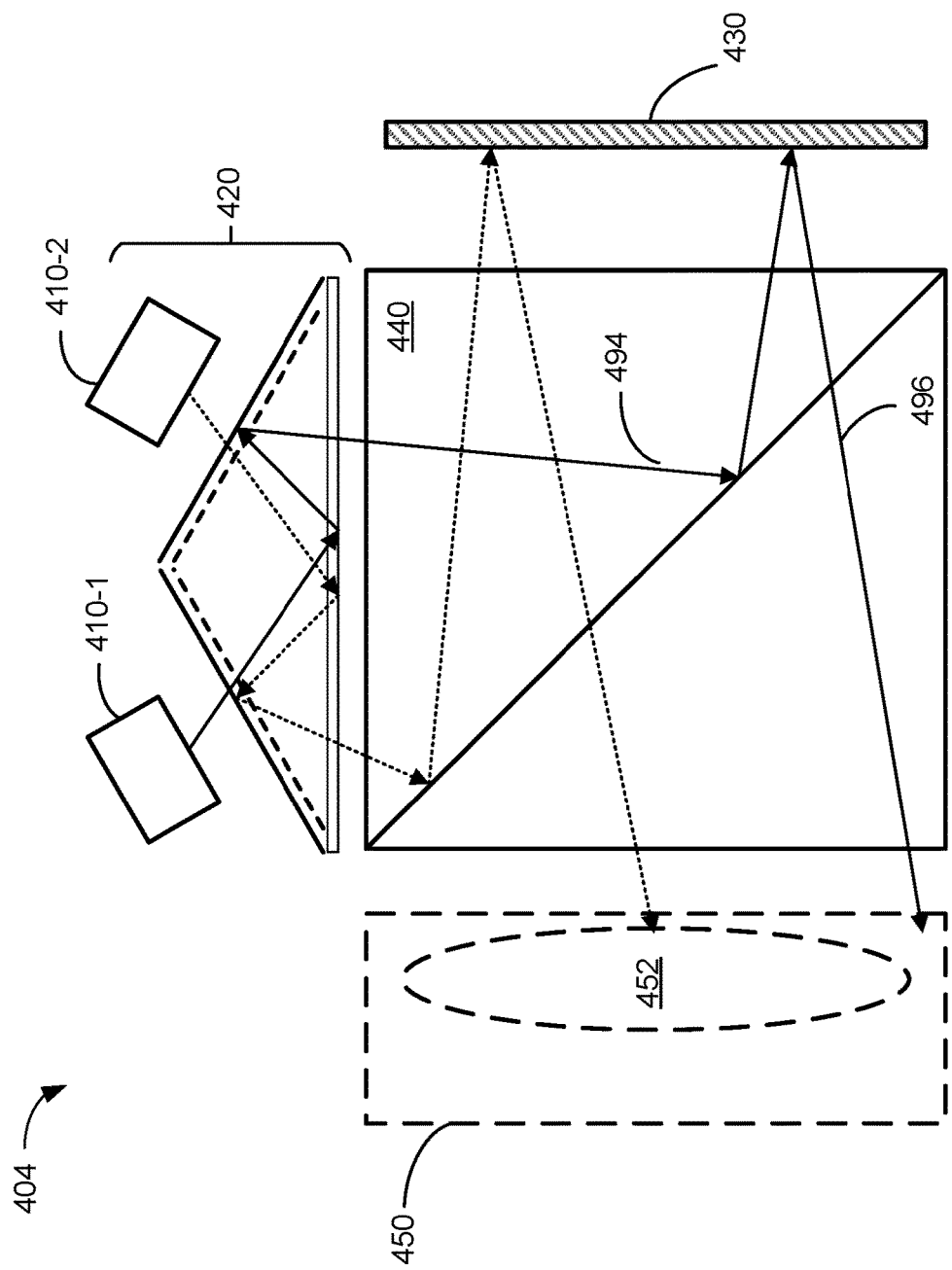

500 ↘

(A)

↓

550 Reflect, at the third optical component, the first illumination light toward the second optical component.

> 552 Transmit, through a second optical retarder of the third optical component, the first illumination light while converting the polarization of the first illumination light from the third polarization to a fourth polarization that is different from each of the first polarization, the second polarization, and the third polarization. Reflect the first illumination light having the fourth polarization at the second reflective polarizer. Transmit, through the second optical retarder, the first illumination light having the fourth polarization toward the second optical component while converting the polarization of the first illumination light from the fourth polarization to the third polarization.

↓

560 Transmit, through the second optical component, the first illumination light toward a spatial light modulator.

> 562 Transmit the first illumination light having the third polarization through the optical surface of the second optical component.

↓

570 Receive, at the spatial light modulator the first illumination light output from the second optical component.

592 Receive, at a beam splitter, the first illumination light transmitted through the second optical component.

Provide, with the beam splitter, the first illumination light in a first direction toward the spatial light modulator.

Receive with the beam splitter, the modulated light output from the spatial light modulator.

Provide, with the beam splitter, the modulated light in a second direction that is non-parallel to the first direction.

594 Receive, at an output assembly, the modulated light output from the spatial light modulator.

Project, from the output assembly, at least a portion of the modulated light.

Figure 5D

OPTICAL ASSEMBLY FOR PROVIDING KOEHLLER ILLUMINATION TO A DISPLAY

TECHNICAL FIELD

This relates generally to display devices, and more specifically to illuminators for use in head-mounted display devices.

BACKGROUND

Head-mounted display devices (also called herein head-mounted displays) are gaining popularity as means for providing visual information to a user. For example, the head-mounted display devices are used for virtual reality and augmented reality operations.

Light, compact, and energy-efficient displays are desired in head-mounted display devices in order to improve a user experience with virtual reality and augmented reality operations. Additionally, uniform illumination light is desired in order to provide users with high quality images.

SUMMARY

Accordingly, there is a need for compact and lightweight head-mounted display devices with high quality images. Such head-mounted display devices will enhance user experience with virtual reality and/or augmented reality operations.

The above deficiencies and other problems associated with conventional head-mounted displays are reduced or eliminated by the disclosed optical components and display devices.

In accordance with some embodiments, an illumination assembly for use in a display device includes a first light source and an optical assembly. The first light source is configured to provide first illumination light. The optical assembly includes a first optical component, a second optical component, and a third optical component. The light source, the first optical component, the second optical component, and the third optical component are positioned relative to one another so that the first illumination light is: (i) received by at the first optical component, (ii) is transmitted through the first optical component toward the second optical component, (iii) is reflected at the second optical component toward the third optical component, (iv) is reflected at the third optical component toward the second optical component, and (v) is transmitted through the second optical component.

In accordance with some embodiments, a display device includes a first light source and an optical assembly. The first light source is configured to provide first illumination light. The optical assembly includes a first optical component, a second optical component, and a third optical component. The light source, the first optical component, the second optical component, and the third optical component are positioned relative to one another so that the first illumination light is: (i) received by at the first optical component, (ii) is transmitted through the first optical component toward the second optical component, (iii) is reflected at the second optical component toward the third optical component, (iv) is reflected at the third optical component toward the second optical component, and (v) is transmitted through the second optical component. In some embodiments, the display device also includes a spatial light modulator.

In accordance with some embodiments, a method includes (i) outputting first illumination light from a first light source, (ii) receiving the first illumination light at a first optical component, (iii) transmitting the first illumination light through the first optical component toward a second optical component, (iv) reflecting the first illumination light at the second optical component and toward a third optical component, (v) reflecting the first illumination light at the third optical component and toward the second optical component, (vi) transmitting the first illumination light through the second optical component toward a spatial light modulator, and (vii) receiving the first illumination light output from the second optical component at the spatial light modulator.

Thus, the disclosed embodiments provide lightweight and compact illumination assemblies that provide uniform illumination and high quality images in display devices. In some embodiments, the display devices are head-mounted display devices.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 3A is an isometric view of a display device in accordance with some embodiments.

FIGS. 4A-4I are schematic diagrams illustrating illumination assemblies in accordance with some embodiments.

FIGS. 5A-5D is a flow diagram illustrating a method of illuminating a spatial light modulator in accordance with some embodiments.

These figures are not drawn to scale unless indicated otherwise.

DETAILED DESCRIPTION

There is a need for head-mounted illumination assemblies that are lightweight, compact, and can provide uniform illumination in display devices.

The present disclosure provides illumination assemblies that produce uniform illumination in a compact footprint. The illumination assembly includes an optical assembly that is configured to direct illumination light emitted from one or more light sources toward a spatial light modulator. The optical assembly includes one or more optical components that substantially collimate the illumination light so that the spatial light modulator receives uniform illumination.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to obscure other aspects of the embodiments.

It will also be understood that, although the terms first, second, etc. are, in some instances, used herein to describe various elements, these elements should not be limited by these terms. These terms are used only to distinguish one element from another. For example, a first reflector could be termed a second reflector, and, similarly, a second reflector could be termed a first reflector, without departing from the scope of the various described embodiments. The first reflector and the second reflector are both light reflectors, but they are not the same reflector.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind."

Figure 1:
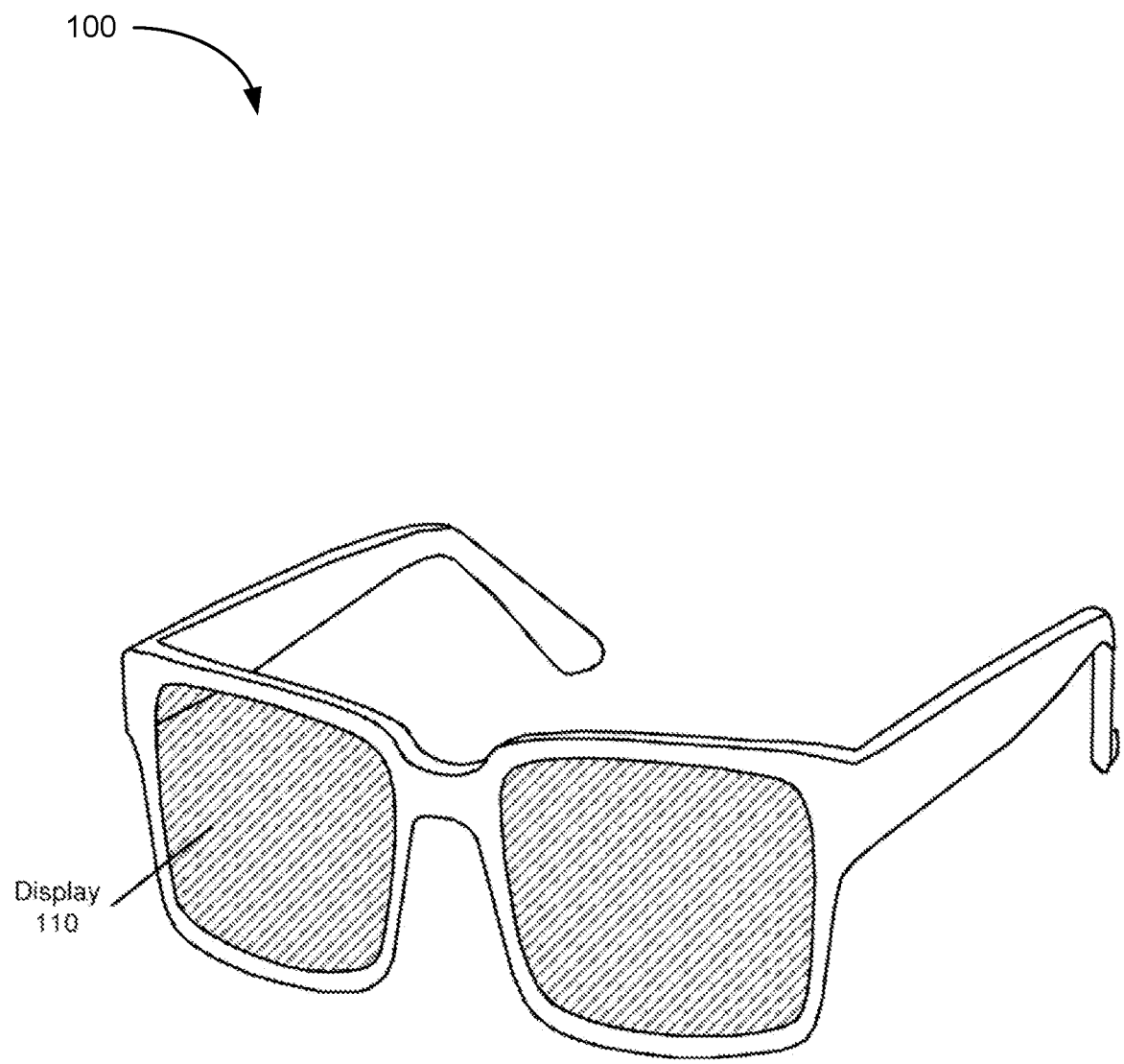
FIG. 1 is a perspective view of a display device in accordance with some embodiments.

FIG. 1 illustrates display device 100 in accordance with some embodiments. In some embodiments, display device 100 is configured to be worn on a head of a user (e.g., by having the form of spectacles or eyeglasses, as shown in FIG. 1) or to be included as part of a helmet that is to be worn by the user. When display device 100 is configured to be worn on a head of a user or to be included as part of a helmet, display device 100 is called a head-mounted display. Alternatively, display device 100 is configured for placement in proximity of an eye or eyes of the user at a fixed location, without being head-mounted (e.g., display device 100 is mounted in a vehicle, such as a car or an airplane, for placement in front of an eye or eyes of the user). As shown in FIG. 1, display device 100 includes display 110. Display 110 is configured for presenting visual contents (e.g., augmented reality contents, virtual reality contents, mixed reality contents, or any combination thereof) to a user.

Figure 2:
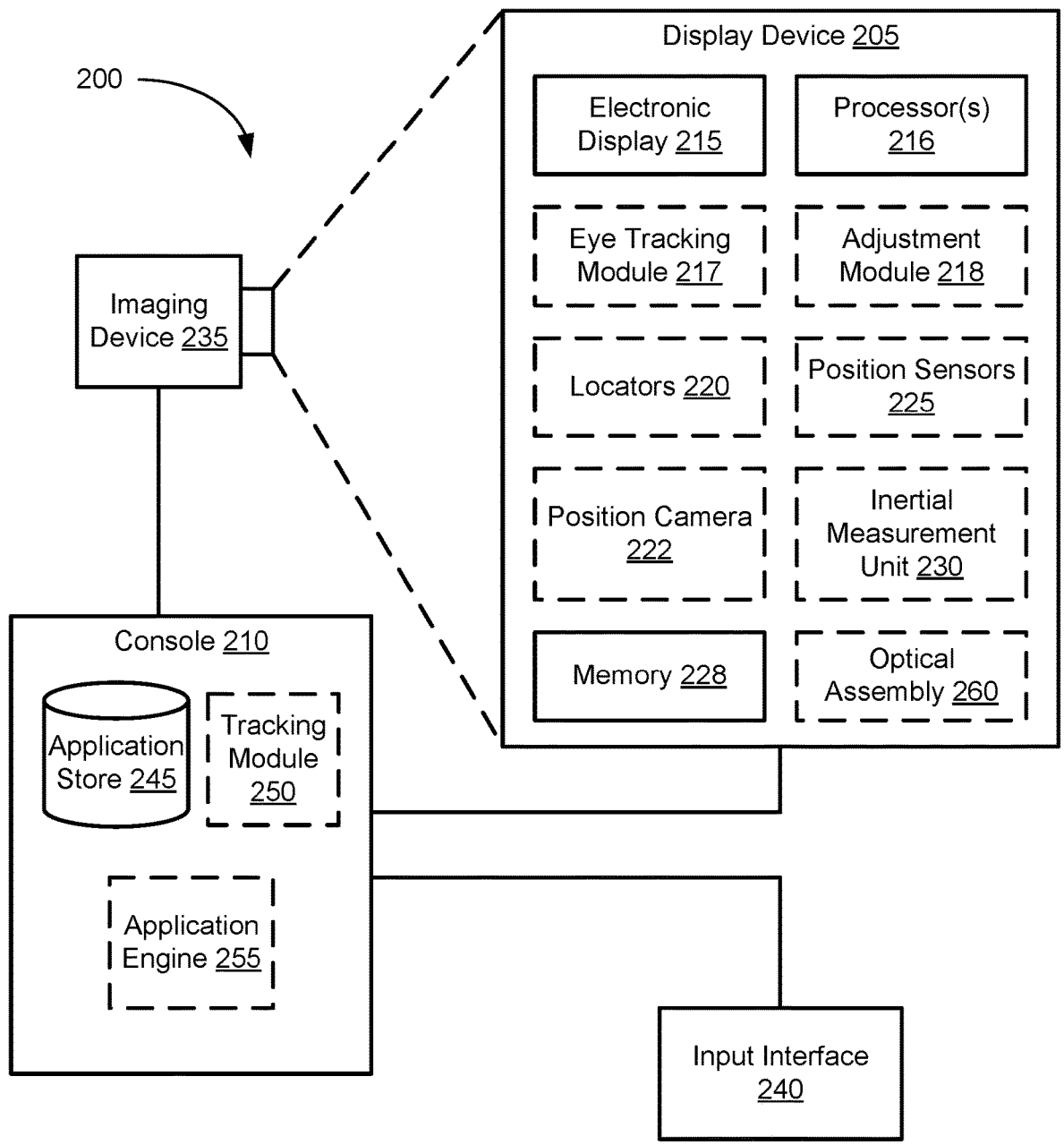
FIG. 2 is a block diagram of a system including a display device in accordance with some embodiments.

In some embodiments, display device 100 includes one or more components described herein with respect to FIG. 2. In some embodiments, display device 100 includes additional components not shown in FIG. 2.

FIG. 2 is a block diagram of system 200 in accordance with some embodiments. The system 200 shown in FIG. 2 includes display device 205 (which corresponds to display device 100 shown in FIG. 1), imaging device 235, and input interface 240 that are each coupled to console 210. While FIG. 2 shows an example of system 200 including display device 205, imaging device 235, and input interface 240, in other embodiments, any number of these components may be included in system 200. For example, there may be multiple display devices 205 each having associated input interface 240 and being monitored by one or more imaging devices 235, with each display device 205, input interface 240, and imaging devices 235 communicating with console 210. In alternative configurations, different and/or additional components may be included in system 200. For example, in some embodiments, console 210 is connected via a network (e.g., the Internet) to system 200 or is self-contained as part of display device 205 (e.g., physically located inside display device 205). In some embodiments, display device 205 is used to create mixed reality by adding in a view of the real surroundings. Thus, display device 205 and system 200 described here can deliver augmented reality, virtual reality, and mixed reality.

In some embodiments, as shown in FIG. 1, display device 205 corresponds to display device 100 and is a head-mounted display that presents media to a user. Examples of media presented by display device 205 include one or more images, video, audio, or some combination thereof. In some embodiments, audio is presented via an external device (e.g., speakers and/or headphones) that receives audio information from display device 205, console 210, or both, and presents audio data based on the audio information. In some embodiments, display device 205 immerses a user in an augmented environment.

In some embodiments, display device 205 also acts as an augmented reality (AR) headset. In these embodiments, display device 205 augments views of a physical, real-world environment with computer-generated elements (e.g., images, video, sound, etc.). Moreover, in some embodiments, display device 205 is able to cycle between different types of operation. Thus, display device 205 operate as a virtual reality (VR) device, an augmented reality (AR) device, as glasses or some combination thereof (e.g., glasses with no optical correction, glasses optically corrected for the user, sunglasses, or some combination thereof) based on instructions from application engine 255.

Display device 205 includes electronic display 215, one or more processors 216, eye tracking module 217, adjustment module 218, one or more locators 220, one or more position sensors 225, one or more position cameras 222, memory 228, inertial measurement unit (IMU) 230, one or more optical assemblies 260, or a subset or superset thereof (e.g., display device 205 with electronic display 215, optical assembly 260, without any other listed components). Some embodiments of display device 205 have different modules than those described here. Similarly, the functions can be distributed among the modules in a different manner than is described here.

One or more processors 216 (e.g., processing units or cores) execute instructions stored in memory 228. Memory 228 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 228, or alternately the non-volatile memory device(s) within memory 228, includes a non-transitory computer readable storage medium. In some embodiments, memory 228 or the computer readable storage medium of memory 228 stores programs, modules and data structures, and/or instructions for displaying one or more images on electronic display 215.

Electronic display 215 displays images to the user in accordance with data received from console 210 and/or processor(s) 216. In various embodiments, electronic display 215 may comprise a single adjustable display element or multiple adjustable display elements (e.g., a display for each eye of a user). In some embodiments, electronic display 215 is configured to project images to the user through one or more optical assemblies 260.

In some embodiments, the display element includes one or more light emission devices and a corresponding array of spatial light modulators. A spatial light modulator is an array of electro-optic pixels, opto-electronic pixels, some other array of devices that dynamically adjust the amount of light transmitted by each device, or some combination thereof. These pixels are placed behind one or more lenses. In some embodiments, the spatial light modulator is an array of liquid crystal based pixels in an LCD (a Liquid Crystal Display). Examples of the light emission devices include: an organic light emitting diode, an active-matrix organic light-emitting diode, a light emitting diode, some type of device capable of being placed in a flexible display, or some combination thereof. The light emission devices include devices that are capable of generating visible light (e.g., red, green, blue, etc.) used for image generation. The spatial light modulator is configured to selectively attenuate individual light emission devices, groups of light emission devices, or some combination thereof. Alternatively, when the light emission devices are configured to selectively attenuate individual emission devices and/or groups of light emission devices, the display element includes an array of such light emission devices without a separate emission intensity array.

One or more optical components in the one or more optical assemblies 260 direct light from the arrays of light emission devices (optionally through the emission intensity arrays) to locations within each eyebox and ultimately to the back of the user's retina(s). An eyebox is a region that is occupied by an eye of a user of display device 205 (e.g., a user wearing display device 205) who is viewing images from display device 205. In some cases, the eyebox is represented as a 10 mm×10 mm square. In some embodiments, the one or more optical components include one or more coatings, such as anti-reflective coatings, and one or more polarization volume holograms (PVH).

In some embodiments, the display element includes an infrared (IR) detector array that detects IR light that is retro-reflected from the retinas of a viewing user, from the surface of the corneas, lenses of the eyes, or some combination thereof. The IR detector array includes an IR sensor or a plurality of IR sensors that each correspond to a different position of a pupil of the viewing user's eye. In alternate embodiments, other eye tracking systems may also be employed.

Eye tracking module 217 determines locations of each pupil of a user's eyes. In some embodiments, eye tracking module 217 instructs electronic display 215 to illuminate the eyebox with IR light (e.g., via IR emission devices in the display element).

A portion of the emitted IR light will pass through the viewing user's pupil and be retro-reflected from the retina toward the IR detector array, which is used for determining the location of the pupil. Additionally or alternatively, the reflection off of the surfaces of the eye is used to also determine location of the pupil. In some cases, the IR detector array scans for retro-reflection and identifies which IR emission devices are active when retro-reflection is detected. Eye tracking module 217 may use a tracking lookup table and the identified IR emission devices to determine the pupil locations for each eye. The tracking lookup table maps the received signals on the IR detector array to locations (corresponding to pupil locations) in each eyebox. In some embodiments, the tracking lookup table is generated via a calibration procedure (e.g., user looks at various known reference points in an image and eye tracking module 217 maps the locations of the user's pupil while looking at the reference points to corresponding signals received on the IR tracking array). As mentioned above, in some embodiments, system 200 may use other eye tracking systems than the embedded IR eye tracking system described herein.

Adjustment module 218 generates an image frame based on the determined locations of the pupils. In some embodiments, this sends a discrete image to the display that will tile sub-images together thus a coherent stitched image will appear on the back of the retina. Adjustment module 218 adjusts an output (i.e. the generated image frame) of electronic display 215 based on the detected locations of the pupils. Adjustment module 218 instructs portions of electronic display 215 to pass image light to the determined locations of the pupils. In some embodiments, adjustment module 218 also instructs the electronic display not to provide image light to positions other than the determined locations of the pupils. Adjustment module 218 may, for example, block and/or stop light emission devices whose image light falls outside of the determined pupil locations, allow other light emission devices to emit image light that falls within the determined pupil locations, translate and/or rotate one or more display elements, dynamically adjust curvature and/or refractive power of one or more active lenses in the lens (e.g., microlens) arrays, or some combination thereof.

Optional locators 220 are objects located in specific positions on display device 205 relative to one another and relative to a specific reference point on display device 205. A locator 220 may be a light emitting diode (LED), a corner cube reflector, a reflective marker, a type of light source that contrasts with an environment in which display device 205 operates, or some combination thereof. In embodiments where locators 220 are active (i.e., an LED or other type of light emitting device), locators 220 may emit light in the visible band (e.g., about 400 nm to 750 nm), in the infrared band (e.g., about 750 nm to 1 mm), in the ultraviolet band (about 100 nm to 400 nm), some other portion of the electromagnetic spectrum, or some combination thereof.

In some embodiments, locators 220 are located beneath an outer surface of display device 205, which is transparent to the wavelengths of light emitted or reflected by locators 220 or is thin enough to not substantially attenuate the wavelengths of light emitted or reflected by locators 220. Additionally, in some embodiments, the outer surface or other portions of display device 205 are opaque in the visible band of wavelengths of light. Thus, locators 220 may emit light in the IR band under an outer surface that is transparent in the IR band but opaque in the visible band.

IMU 230 is an electronic device that generates calibration data based on measurement signals received from one or more position sensors 225. Position sensor 225 generates one or more measurement signals in response to motion of display device 205. Examples of position sensors 225 include: one or more accelerometers, one or more gyroscopes, one or more magnetometers, another suitable type of sensor that detects motion, a type of sensor used for error correction of IMU 230, or some combination thereof. Position sensors 225 may be located external to IMU 230, internal to IMU 230, or some combination thereof.

Based on the one or more measurement signals from one or more position sensors 225, IMU 230 generates first calibration data indicating an estimated position of display device 205 relative to an initial position of display device 205. For example, position sensors 225 include multiple accelerometers to measure translational motion (forward/back, up/down, left/right) and multiple gyroscopes to measure rotational motion (e.g., pitch, yaw, roll). In some embodiments, IMU 230 rapidly samples the measurement signals and calculates the estimated position of display device 205 from the sampled data. For example, IMU 230 integrates the measurement signals received from the accelerometers over time to estimate a velocity vector and integrates the velocity vector over time to determine an estimated position of a reference point on display device 205. Alternatively, IMU 230 provides the sampled measurement signals to console 210, which determines the first calibration data. The reference point is a point that may be used to describe the position of display device 205. While the reference point may generally be defined as a point in space; however, in practice the reference point is defined as a point within display device 205 (e.g., a center of IMU 230).

In some embodiments, IMU 230 receives one or more calibration parameters from console 210. As further discussed below, the one or more calibration parameters are used to maintain tracking of display device 205. Based on a received calibration parameter, IMU 230 may adjust one or more IMU parameters (e.g., sample rate). In some embodiments, certain calibration parameters cause IMU 230 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

Imaging device 235 generates calibration data in accordance with calibration parameters received from console 210. Calibration data includes one or more images showing observed positions of locators 220 that are detectable by imaging device 235. In some embodiments, imaging device 235 includes one or more still cameras, one or more video cameras, any other device capable of capturing images including one or more locators 220, or some combination thereof. Additionally, imaging device 235 may include one or more filters (e.g., used to increase signal to noise ratio). Imaging device 235 is configured to optionally detect light emitted or reflected from locators 220 in a field of view of imaging device 235. In embodiments where locators 220 include passive elements (e.g., a retroreflector), imaging device 235 may include a light source that illuminates some or all of locators 220, which retro-reflect the light toward the light source in imaging device 235. Second calibration data is communicated from imaging device 235 to console 210, and imaging device 235 receives one or more calibration parameters from console 210 to adjust one or more imaging parameters (e.g., focal length, focus, frame rate, ISO, sensor temperature, shutter speed, aperture, etc.).

In some embodiments, display device 205 includes one or more optical assemblies 260. In some embodiments, display device 205 optionally includes a single optical assembly 260 or multiple optical assemblies 260 (e.g., an optical assembly 260 for each eye of a user). In some embodiments, the one or more optical assemblies 260 receive image light for the computer generated images from the electronic display device(s) 215 and direct the image light toward an eye or eyes of a user. The computer-generated images include still images, animated images, and/or a combination thereof. The computer-generated images include objects that appear to be two-dimensional and/or three-dimensional objects.

In some embodiments, electronic display device 215 projects computer-generated images to one or more reflective elements (not shown), and the one or more optical assemblies receive the image light from the one or more reflective elements and direct the image light to the eye(s) of the user. In some embodiments, the one or more reflective elements are partially transparent (e.g., the one or more reflective elements have a transmittance of at least 15%, 20%, 25%, 30%, 35%, 40%, 45%, or 50%), which allows transmission of ambient light. In such embodiments, computer-generated images projected by electronic display 215 are superimposed with the transmitted ambient light (e.g., transmitted ambient image) to provide augmented reality images.

Input interface 240 is a device that allows a user to send action requests to console 210. An action request is a request to perform a particular action. For example, an action request may be to start or end an application or to perform a particular action within the application. Input interface 240 may include one or more input devices. Example input devices include: a keyboard, a mouse, a game controller, data from brain signals, data from other parts of the human body, or any other suitable device for receiving action requests and communicating the received action requests to console 210. An action request received by input interface 240 is communicated to console 210, which performs an action corresponding to the action request. In some embodiments, input interface 240 may provide haptic feedback to the user in accordance with instructions received from console 210. For example, haptic feedback is provided when an action request is received, or console 210 communicates instructions to input interface 240 causing input interface 240 to generate haptic feedback when console 210 performs an action.

Console 210 provides media to display device 205 for presentation to the user in accordance with information received from one or more of: imaging device 235, display device 205, and input interface 240. In the example shown in FIG. 2, console 210 includes application store 245, tracking module 250, and application engine 255. Some embodiments of console 210 have different modules than those described in conjunction with FIG. 2. Similarly, the functions further described herein may be distributed among components of console 210 in a different manner than is described here.

When application store 245 is included in console 210, application store 245 stores one or more applications for execution by console 210. An application is a group of instructions, that when executed by a processor, is used for generating content for presentation to the user. Content generated by the processor based on an application may be in response to inputs received from the user via movement of display device 205 or input interface 240. Examples of applications include: gaming applications, conferencing applications, video playback application, or other suitable applications.

When tracking module 250 is included in console 210, tracking module 250 calibrates system 200 using one or more calibration parameters and may adjust one or more calibration parameters to reduce error in determination of the position of display device 205. For example, tracking module 250 adjusts the focus of imaging device 235 to obtain a more accurate position for observed locators on display device 205. Moreover, calibration performed by tracking module 250 also accounts for information received from IMU 230. Additionally, if tracking of display device 205 is lost (e.g., imaging device 235 loses line of sight of at least a threshold number of locators 220), tracking module 250 re-calibrates some or all of system 200.

In some embodiments, tracking module 250 tracks movements of display device 205 using second calibration data from imaging device 235. For example, tracking module 250 determines positions of a reference point of display device 205 using observed locators from the second calibration data and a model of display device 205. In some embodiments, tracking module 250 also determines positions of a reference point of display device 205 using position information from the first calibration data. Additionally, in some embodiments, tracking module 250 may use portions of the first calibration data, the second calibration data, or some combination thereof, to predict a future location of display device 205. Tracking module 250 provides the estimated or predicted future position of display device 205 to application engine 255.

Application engine 255 executes applications within system 200 and receives position information, acceleration information, velocity information, predicted future positions, or some combination thereof of display device 205 from tracking module 250. Based on the received information, application engine 255 determines content to provide to display device 205 for presentation to the user. For example, if the received information indicates that the user has looked to the left, application engine 255 generates content for display device 205 that mirrors the user's movement in an augmented environment. Additionally, application engine 255 performs an action within an application executing on console 210 in response to an action request received from input interface 240 and provides feedback to the user that the action was performed. The provided feedback may be visual or audible feedback via display device 205 or haptic feedback via input interface 240.

FIG. 3A is an isometric view of display device 300 in accordance with some embodiments. In some other embodiments, display device 300 is part of some other electronic display (e.g., a digital microscope, a head-mounted display device, etc.). In some embodiments, display device 300 includes light emission device 310 and an optical assembly 330, which may include one or more lenses and/or other optical components. In some embodiments, display device 300 also includes an IR detector array.

Light emission device 310 emits image light and optional IR light toward the viewing user. Light emission device 310 includes one or more light emission components that emit light in the visible light (and optionally includes components that emit light in the IR). Light emission device 310 may include, e.g., an array of LEDs, an array of microLEDs, an array of OLEDs, or some combination thereof.

In some embodiments, light emission device 310 includes an emission intensity array (e.g., a spatial light modulator) configured to selectively attenuate light emitted from light emission device 310. In some embodiments, the emission intensity array is composed of a plurality of liquid crystal cells or pixels, groups of light emission devices, or some combination thereof. Each of the liquid crystal cells is, or in some embodiments, groups of liquid crystal cells are, addressable to have specific levels of attenuation. For example, at a given time, some of the liquid crystal cells may be set to no attenuation, while other liquid crystal cells may be set to maximum attenuation. In this manner, the emission intensity array is able to provide image light and/or control what portion of the image light is passed to the optical assembly 330. In some embodiments, display device 300 uses the emission intensity array to facilitate providing image light to a location of pupil 350 of eye 340 of a user, and minimize the amount of image light provided to other areas in the eyebox.

The optical assembly 330 includes one or more lenses. The one or more lenses in optical assembly 330 receive modified image light (e.g., attenuated light) from light emission device 310, and direct the modified image light to a location of pupil 350. The optical assembly 330 may include additional optical components, such as color filters, mirrors, etc.

An optional IR detector array detects IR light that has been retro-reflected from the retina of eye 340, a cornea of eye 340, a crystalline lens of eye 340, or some combination thereof. The IR detector array includes either a single IR sensor or a plurality of IR sensitive detectors (e.g., photodiodes). In some embodiments, the IR detector array is separate from light emission device 310. In some embodiments, the IR detector array is integrated into light emission device 310.

In some embodiments, light emission device 310 including an emission intensity array make up a display element. Alternatively, the display element includes light emission device 310 (e.g., when light emission device 310 includes individually adjustable pixels) without the emission intensity array. In some embodiments, the display element additionally includes the IR array. In some embodiments, in response to a determined location of pupil 350, the display element adjusts the emitted image light such that the light output by the display element is refracted by one or more lenses toward the determined location of pupil 350, and not toward other locations in the eyebox.

In some embodiments, display device 300 includes one or more broadband sources (e.g., one or more white LEDs) coupled with a plurality of color filters, in addition to, or instead of, light emission device 310.

In some embodiments, display device 300 (or light emission device 310 of display device 300) includes a spatial light modulator (e.g., a reflective spatial light modulator), such as a Liquid Crystal on Silicon (LCoS) spatial light modulator. In some embodiments, the LCoS spatial light modulator includes liquid crystals. In some embodiments, the LCoS spatial light modulator includes ferroelectric liquid crystals. The spatial light modulator has an array of pixels (or subpixels), and a respective pixel (or a respective subpixel) is individually controlled to reflect light impinging thereon (e.g., a pixel is activated to reflect light impinging thereon or deactivated to cease reflecting the light impinging thereon) or modulate the reflected light (e.g., a pixel is activated to change the polarization of the reflected light or deactivated to cease changing the polarization of the reflected light, or vice versa). In some embodiments, display device 300 includes multiple spatial light modulators (e.g., a first spatial light modulator for a first color, such as red, a second spatial light modulator for a second color, such as green, and a third spatial light modulator for a third color, such as blue). Such a spatial light modulator requires an illuminator that provides light to the spatial light modulator.

LCoS spatial light modulators typically reflect a portion of illumination light to provide image light, and non-uniformity in the illumination light will lead to non-uniformity in the image light. Thus, there is a need for compact illuminators that can provide uniform illumination of LCoS spatial light modulators.

Figure 3B:
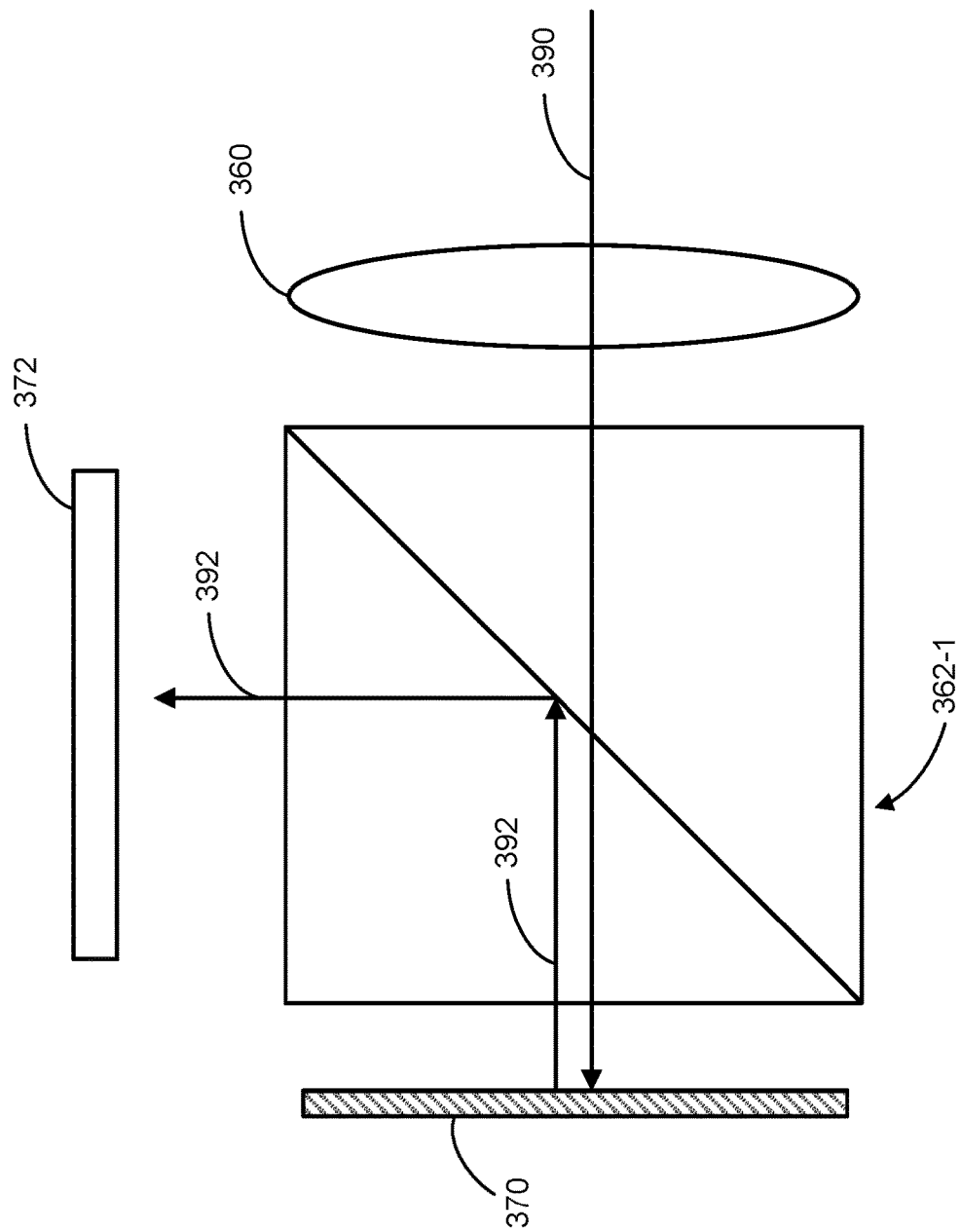
FIGS. 3B and 3C are schematic diagrams illustrating example illumination configurations for use in a display device in accordance with some embodiments.
Figure 3C:
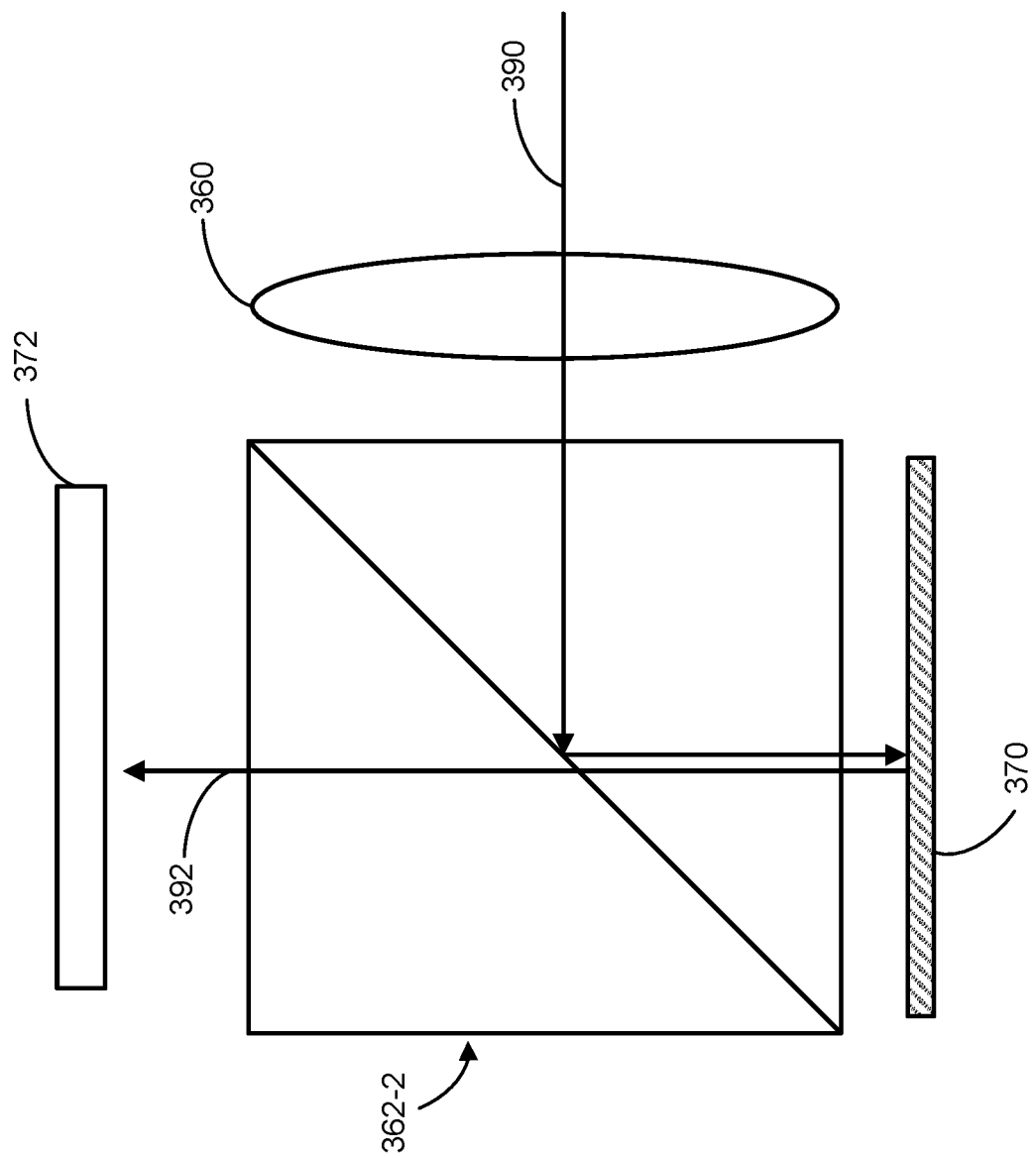

FIGS. 3B and 3C are schematic diagrams illustrating example illumination configurations for use in display device 300 in accordance with some embodiments. In FIGS. 3B and 3C, illumination light 390 is transmitted through an optical assembly 360 (e.g., one or more optical components) toward a polarizing beam splitter (PBS) 362-1 or 362-2. The PBS 362-1 or 362-2 provides the illumination light 390 in a first direction towards a spatial light modulator 370 (e.g., a reflective spatial light modulator, an LCoS spatial light modulator), receives modulated light 392 output from the spatial light modulator 370, and provides the modulated light 392 in a second direction that is different from (e.g., non-parallel to) the first direction (although the first direction in FIG. 3B may not be identical to the first direction in FIG. 3B, and the second direction in FIG. 3C may not be identical to the second direction in FIG. 3C). In FIG. 3B, the illumination light 390 is transmitted through PBS 362-1 (e.g., without a change in direction). Additionally, the modulated light 392, output from the spatial light modulator 370, is reflected by PBS 362-1 toward an output assembly 372 (e.g., display optics or a waveguide with an optical input coupler). In FIG. 3C, the illumination light 390 is reflected by PBS 362-2 toward the spatial light modulator 370 and the modulated light 392, output from the spatial light modulator 370, is transmitted through PBS 362-2 toward output assembly 372 (e.g., without a change in direction).

Figure 4A:
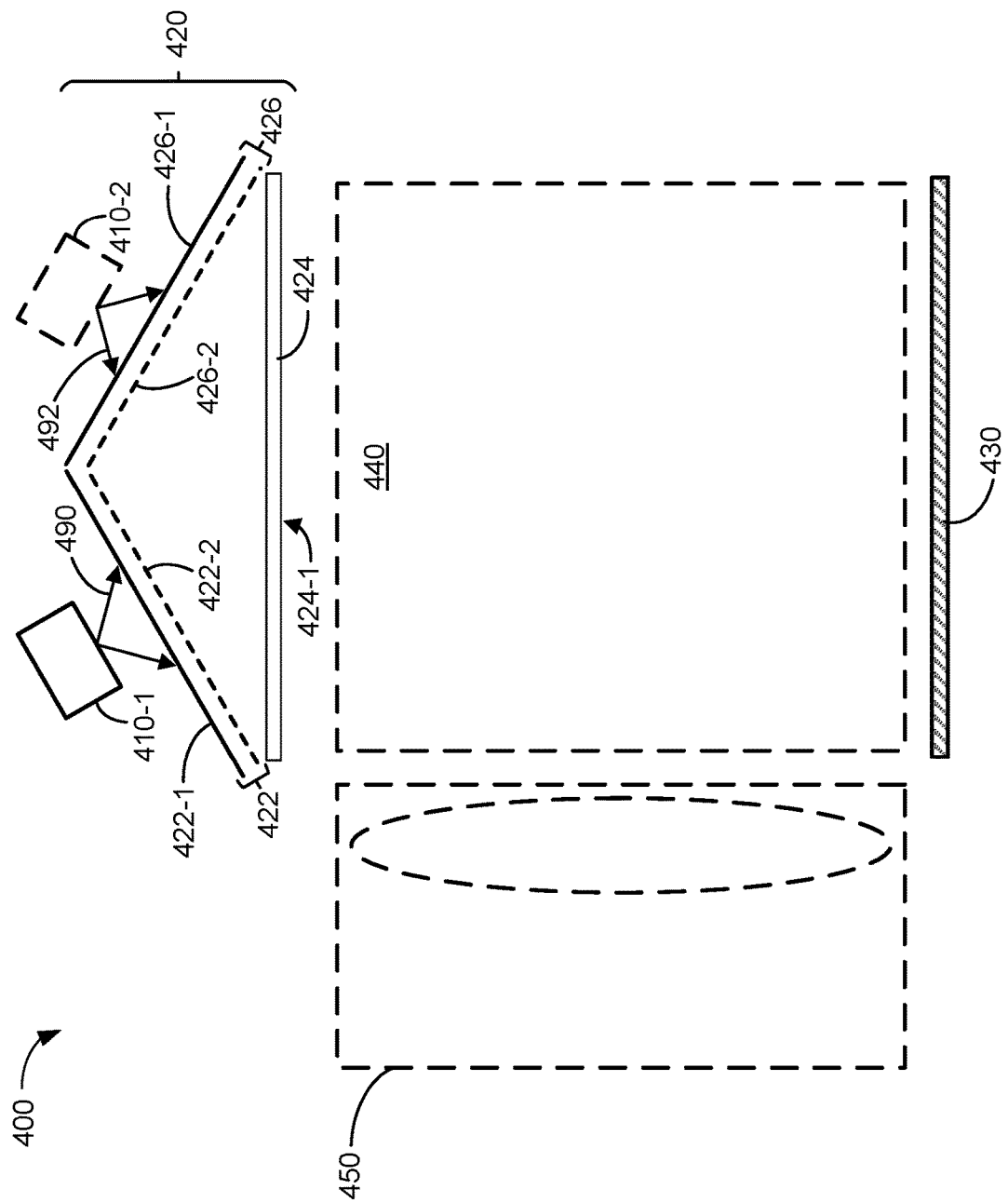
Figure 4B:
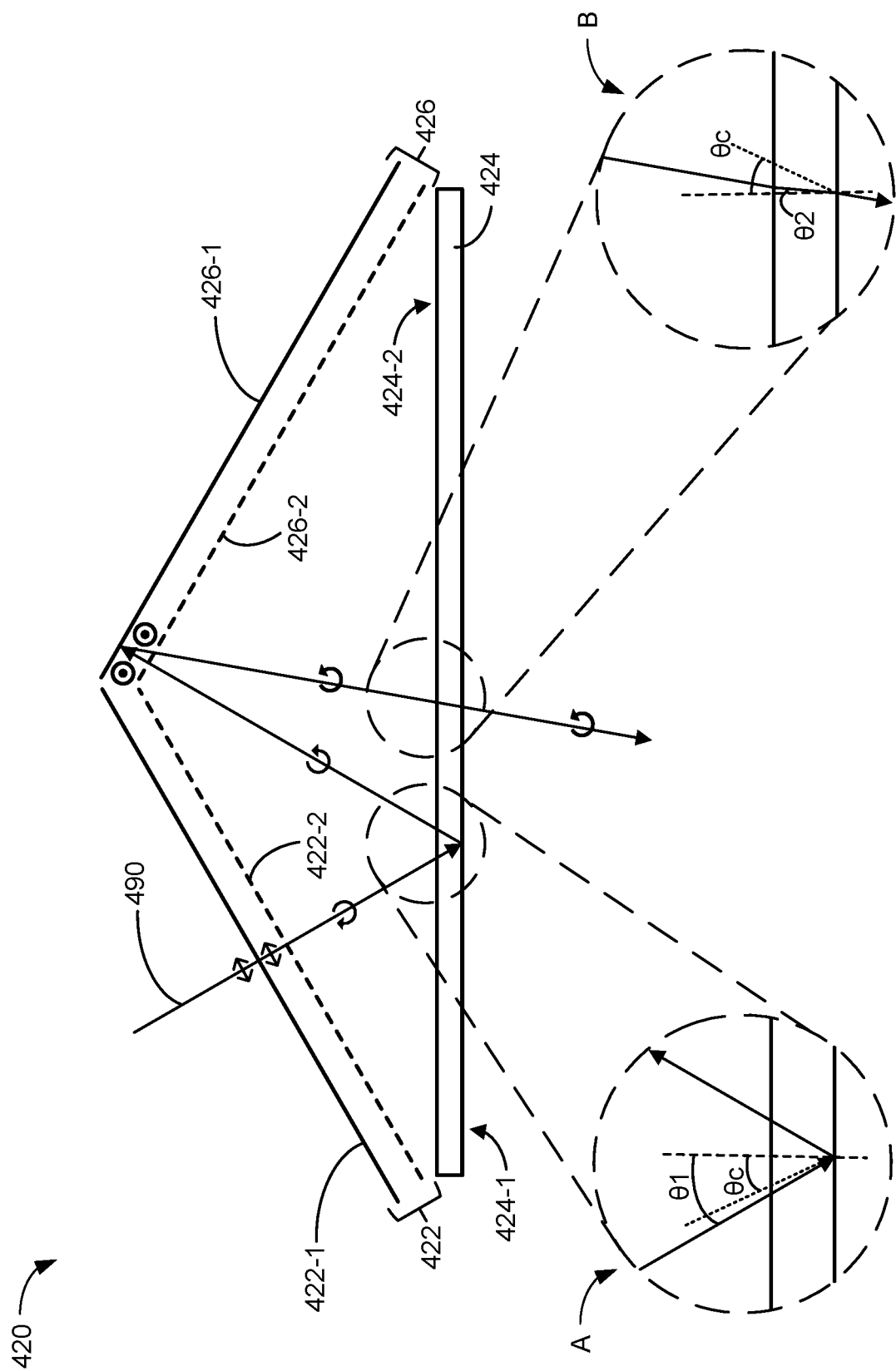
Figure 4C:
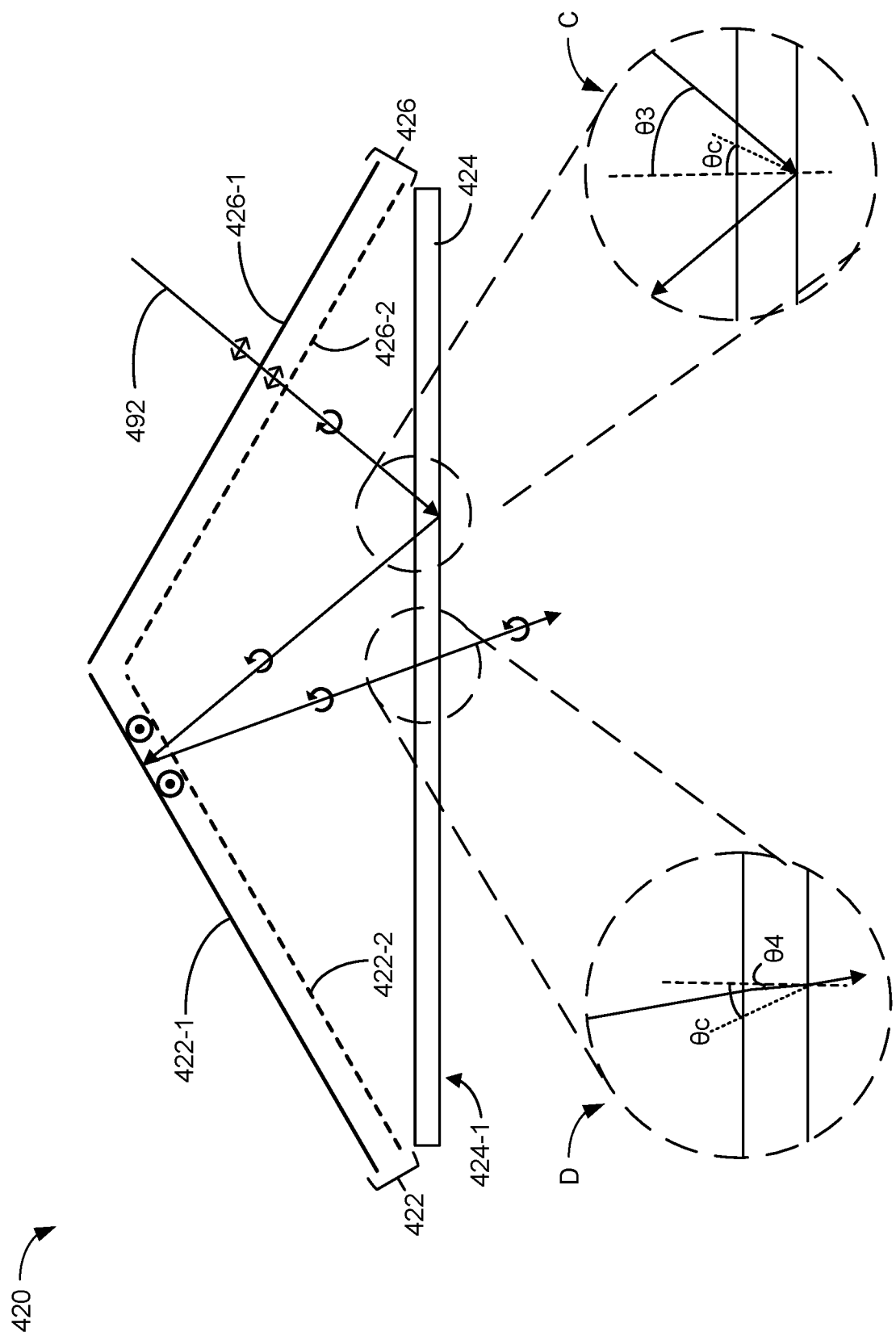
Figure 4D:
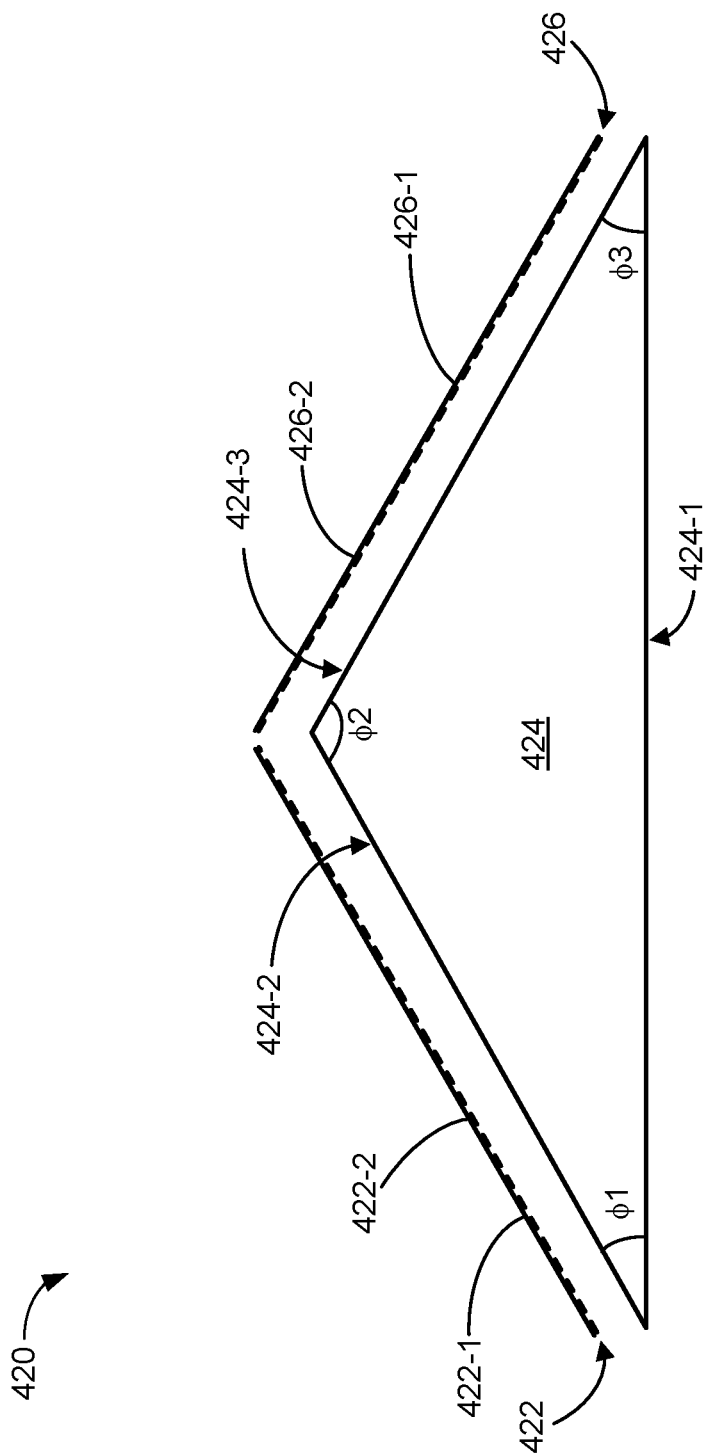
Figure 4E:
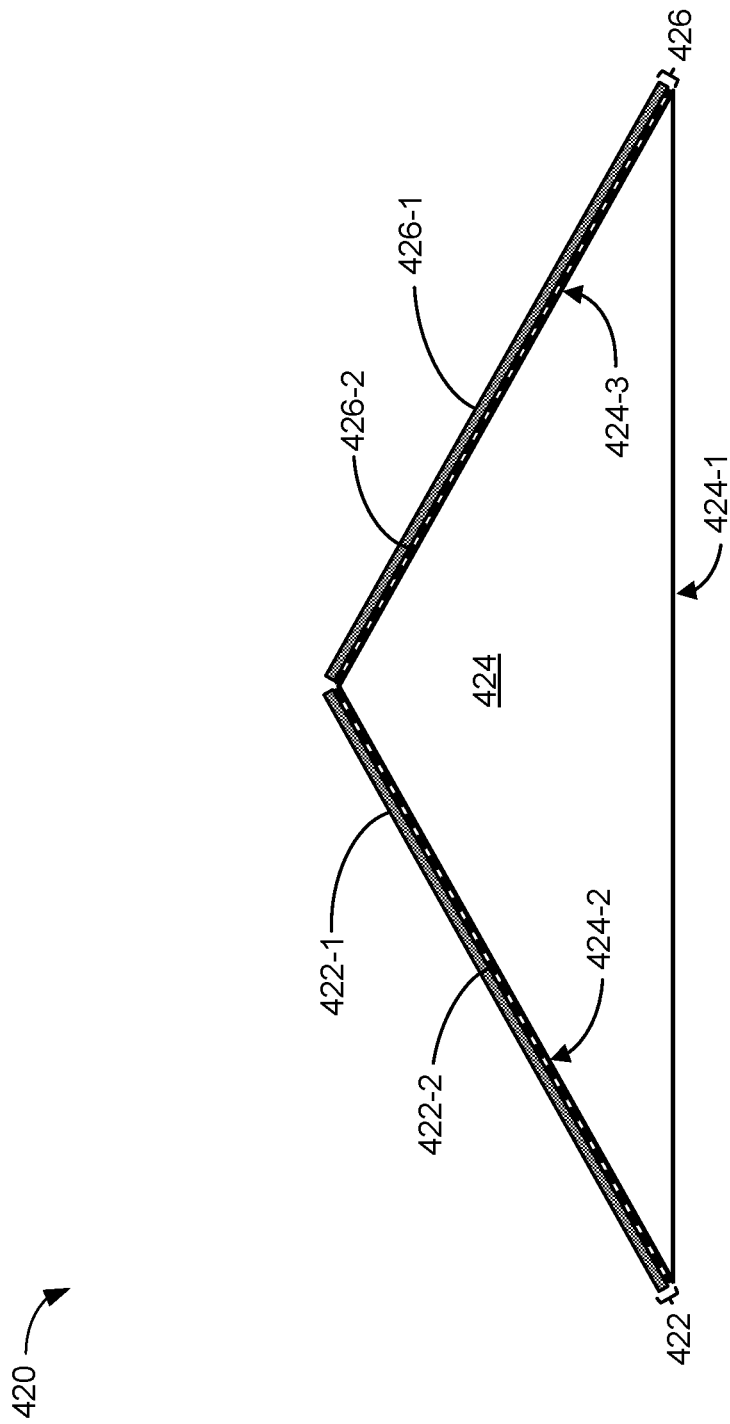
Figure 4F:
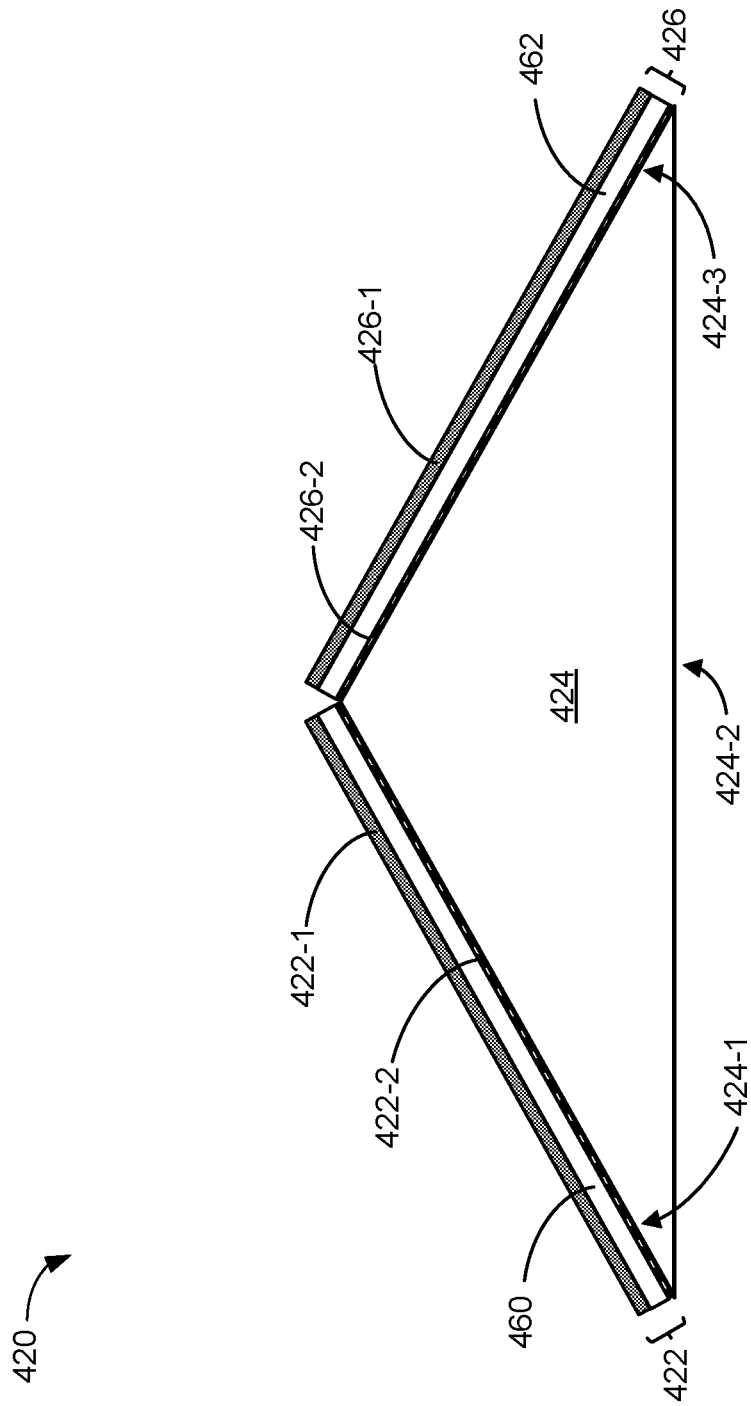
Figure 4G:
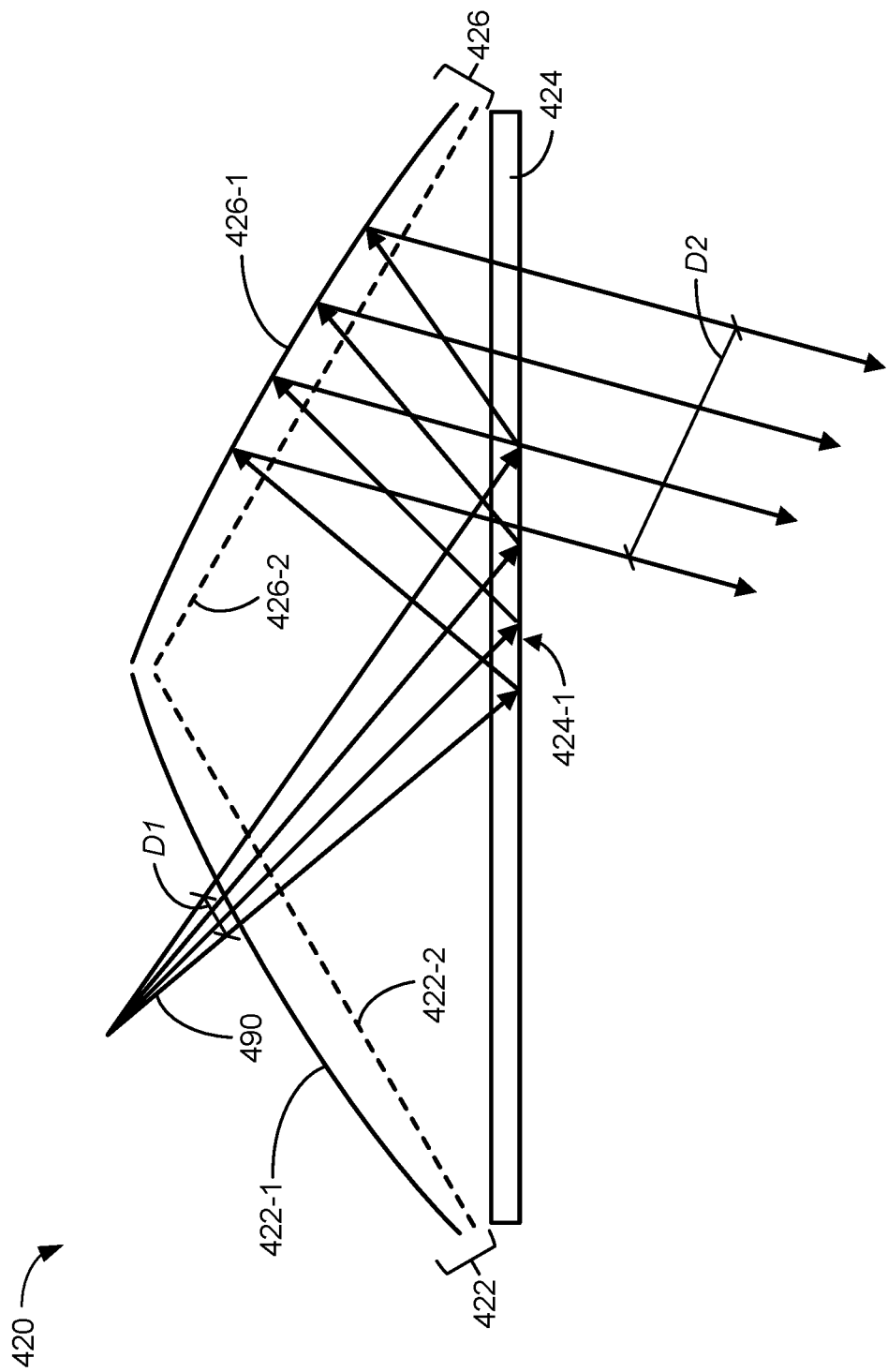
Figure 4H:
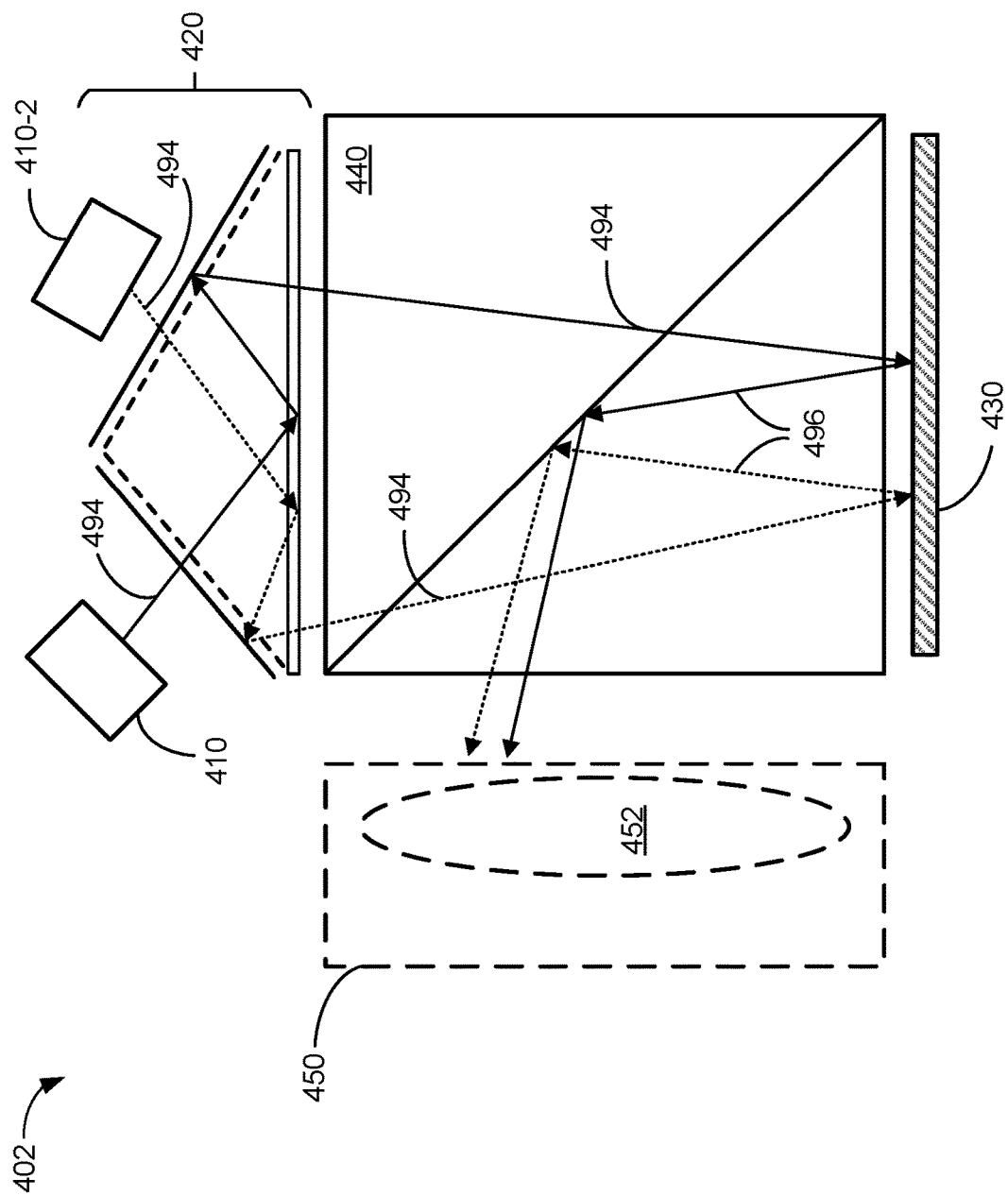
Figure 5A:
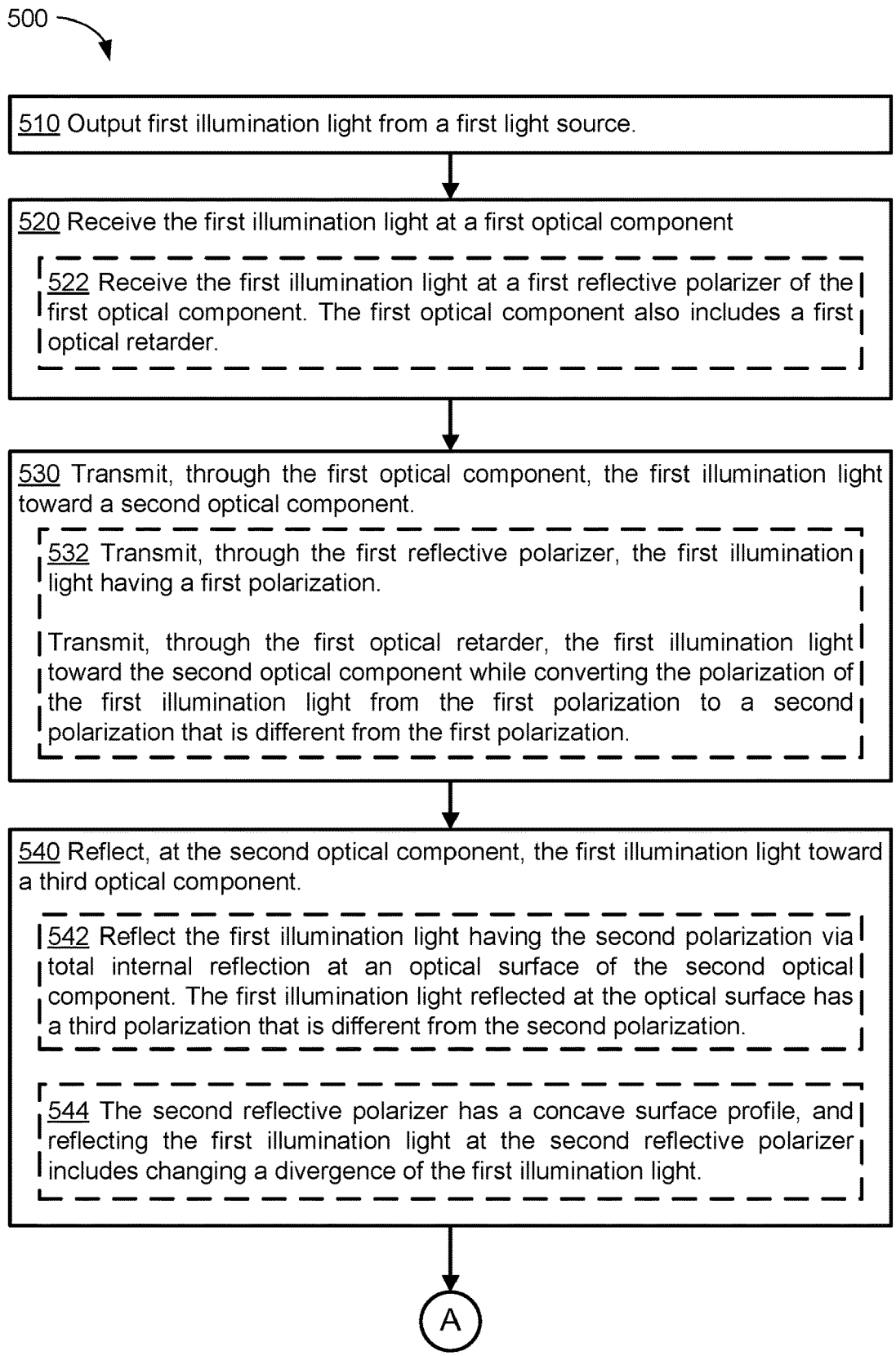
Figure 5C:
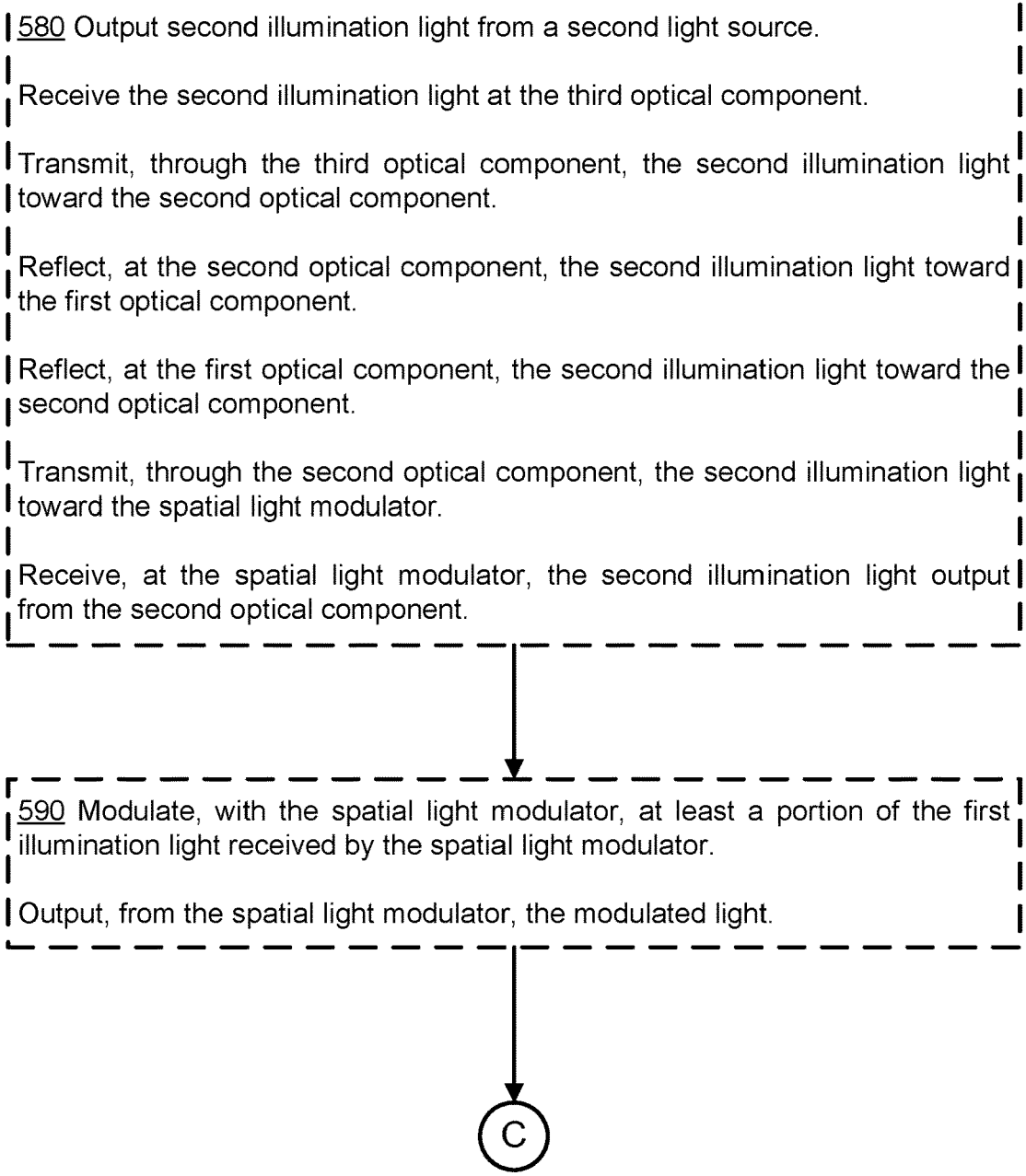

FIGS. 4A, and 4H-4I illustrate example illumination assemblies that enable uniform illumination in display devices in accordance with some embodiments. Such illumination assemblies may be used to illuminate a reflective spatial light modulator, such as an LCoS spatial light modulator. In some embodiments, such optical devices include the reflective spatial light modulator (e.g., the reflective spatial light modulator is integrated into the optical device). In some embodiments, the spatial light modulator is a reflective spatial light modulator. In some embodiments, the display devices disclosed herein are head-mounted display devices.

FIG. 4A is a schematic diagram illustrating an illumination assembly 400 in accordance with some embodiments. As shown in FIG. 4A, the illumination assembly 400 includes one or more light sources 410 (e.g., first light source 410-1 and second light source 410-2), an optical assembly 420, and a spatial light modulator 430. The optical assembly 420 includes a first optical component 422, a second optical component 424, and a third optical component 426. The first optical component 422 includes a first reflective polarizer 422-1 and a first optical retarder 422-2 (e.g., quarter-wave plate). The second optical component 424 has a refractive index that is greater than the refractive index of air and includes an optical surface 424-1. In some embodiments, the optical surface of the second optical component 424 does not include a coating. The third optical component 426 includes a second reflective polarizer 426-1 and a second optical retarder 426-2 (e.g., quarter-wave plate). In some embodiments, the illumination assembly 400 also includes a beam splitter 440 and an output assembly 450 (which in some configurations correspond to output assembly 372, which may include one or more lenses).

The one or more light sources 410 is configured to provide (e.g., output, emit, generate) illumination light. For example, as shown in FIG. 4A, a first light source 410-1 is configured to provide (e.g., output, emit, generate) first illumination light 490 toward the first optical component 422 of the optical assembly 420 and a second light source 410-2 is configured to provide (e.g., output, emit, generate) second illumination light 492 toward the third optical component 426 of the optical assembly 420.

FIGS. 4B-4G are schematic diagrams illustrating the optical assembly 420 in accordance with some embodiments.

Referring to FIG. 4B, the first illumination light 490, output from the first light source 410-1, is received at the first reflective polarizer 422-1 of the first optical component 422. The first reflective polarizer 422-1 is configured to transmit the first illumination light 490 having a first polarization (e.g., a first linear polarization) toward the first optical retarder 422-2. The first optical retarder 422-2 is configured to transmit the first illumination light 490 toward the second optical component 424 while converting the polarization of the first illumination light 490 from the first polarization to a second polarization (e.g., a first circular polarization) that is different from the first polarization. The second optical component 424 is configured to receive the first illumination light 490 having the second polarization and the second optical component 424 (e.g., the optical surface 424-1 of the second optical component 424) is configured to reflect the first illumination light 490 toward the third optical component 426. As shown in inset A, the first illumination light 490 is incident upon the optical surface 424-1 at an incident angle θ1 so that the first illumination light 490 is reflected at the optical surface 424-1 via total internal reflection (e.g., the incident angle θ1 is larger than a critical angle θc where the critical angle is the angle of incidence beyond which rays of light passing through a denser medium to the interface to a less dense medium are no longer refracted but totally reflected). The first illumination light 490 that has been reflected (e.g., via total internal reflection) at the optical surface 424-1 has a third polarization (e.g., a second circular polarization that is orthogonal to the second polarization) and propagates towards the third optical component 426. The second optical retarder 426-2 of the third optical component 426 is configured to transmit the first illumination light 490 while converting the polarization of the first illumination light 490 from the third polarization to a fourth polarization (e.g., a second linear polarization) that is orthogonal to the first polarization. The second reflective polarizer 426-1 of the third optical component 426 is configured to receive the first illumination light 490 having the fourth polarization and reflect the first illumination light 490 toward the second optical retarder 426-2. The second optical retarder 426-2 is configured to transmit the first illumination light 490 toward the second optical component 424 while converting the polarization of the first illumination light 490 from the fourth polarization to the third polarization. As shown in inset B, the first illumination light 490 having the third polarization is incident upon the optical surface 424-1 of the second optical component 424 at an incident angle θ2 that is smaller than the critical angle θc (e.g., θ2<θc) so that first illumination light 490 is transmitted through (or refracted out of) the optical surface 424-1.

Referring to FIG. 4C, the second illumination light 492, output from the second light source 410-2, is received at the second reflective polarizer 426-1 of the third optical component 426. The second reflective polarizer 426-1 is configured to transmit the second illumination light 492 having the first polarization toward the second optical retarder 426-2. The second optical retarder 426-2 is configured to transmit the second illumination light 492 toward the second optical component 424 while converting the polarization of the second illumination light 492 from the first polarization to the second polarization. The second optical component 424 is configured to receive the second illumination light 492 having the second polarization and the optical surface 424-1 of the second optical component 424 is configured to reflect the second illumination light 492 toward the first optical component 422. As shown in inset C, the second illumination light 492 is incident upon the optical surface 424-1 at an incident angle θ3 so that the illumination light 492 is reflected at the optical surface 424-1 via total internal reflection (e.g., θ3>θc). The second illumination light 492 that has been reflected via total internal reflection at the optical surface 424-1 has the third polarization and propagates towards the first optical component 422. The first optical retarder 422-2 of the first optical component 422 is configured to transmit the second illumination light 492 while converting the polarization of the second illumination light 492 from the third polarization to the fourth polarization. The first reflective polarizer 422-1 of the first optical component 422 is configured to receive the second illumination light 492 having the fourth polarization and reflect the second illumination light 492 toward the first optical retarder 422-2. The first optical retarder 422-2 is configured to transmit the second illumination light 492 toward the second optical component 424 while converting the polarization of the second illumination light 492 from the fourth polarization to the third polarization. As shown in inset D, the second illumination light 492 having the third polarization is incident upon the optical surface 424-1 of the second optical component 424 at an incident angle θ4 that is smaller than the critical angle θc (e.g., θ4<θc) so that the second illumination light 492 is transmitted through the optical surface 424-1.

In some embodiments, as shown in FIGS. 4A-4C, the second optical component 424 may include two substantially parallel surfaces (e.g., optical surface 424-1 and an optical surface 424-2 that is parallel to the optical surface 424-1). In some embodiments, the second optical component 424 may be a planar optical component. Alternatively, as shown in FIGS. 4D-4F, the second optical component 424 may be a three-dimensional object having three of more surfaces (e.g., sides, faces), such as a prism (e.g., a triangular prism, a square pyramid, a penta prism) or a polyhedron. In some embodiments, the second optical component 424 includes a first surface 424-1 (e.g., optical surface 424-1), a second surface 424-2 that is non-parallel to the first surface 424-1, and a third surface 424-3 that is non-parallel to each of the first surface 424-1 and the second surface 424-2. The first surface 424-1 and the second surface 424-2 form an angle φ1, the third surface 424-3 and the second surface 424-2 form an angle φ2, and the first surface 424-1 and the third surface 424-3 form an angle φ3. In some embodiments, the angle φ1 corresponds to the angle φ2 (e.g., φ1=φ2). In some embodiments, each of the angles φ1, φ2, and φ3 corresponds to one another (e.g., φ1=φ2=φ3). In some embodiments, the second optical component 424 includes one or more axis (or axes) of symmetry.

In some embodiments, as shown in FIG. 4D, the second optical component 424 is separate and distinct from each of the first optical component 422 and the third optical component 426. In some embodiments, the first optical component 422 may also be distinct and separate from the third optical component 426.

In some embodiments, as shown in FIG. 4E, the first optical component 422 is disposed on the second surface 424-2 of the second optical component 424. In some embodiments, the third optical component 426 is disposed on the third surface 424-3 of the second optical component 424.

In some embodiments, as shown in FIG. 4F, the optical assembly 420 may also include a first set of one or more substrates 460 and a second set of one or more substrates 462. In some configurations, such as configurations in which the first optical retarder 422-2 is disposed on the second surface 424-2 of the second optical component 424, the first optical retarder 422-2 may be disposed between the first set of one or more substrates 460 and the second optical component 424. In some configurations, such as configurations in which the second optical retarder 426-2 is disposed on the third surface 424-3 of the second optical component 424, the second optical retarder 426-2 may be disposed between the second set of one or more substrates 462 and the second optical component 424.

In some embodiments, the first optical component 422 (e.g., including first reflective polarizer 422-1 and first optical retarder 422-2) is disposed between the first set of one or more substrates 460 and the second optical component 424. In some embodiments, the third optical component 426 (e.g., including second reflective polarizer 426-1 and second optical retarder 426-2) is disposed between the second set of one or more substrates 462 and the second optical component 424.

In some embodiments, as shown in FIG. 4G, at least one of the first reflective polarizer 422-1 or the second reflective polarizer 426-1 has a curved profile (e.g., at least one of the first reflective polarizer 422-1 or the second reflective polarizer 426-1 is curved, and in some configurations, has a concave surface profile facing the second optical component 424). In configurations in which the second reflective polarizer 426-1 has a curved profile, the second reflective polarizer 426-1 changes a divergence of the first illumination light 490 (e.g., substantially collimate the first illumination light 490). For example, the first illumination light 490 output from the first light source 410 has a first divergence profile D1 (e.g., the first illumination light 490 is diverging) and the first illumination light 490, after reflection at the second reflective polarizer 426-1, has a second divergence profile D2 (e.g., the first illumination light 490 is substantially collimated) that is different from the first divergence profile. In some embodiments, the first illumination light 490 transmitted through the optical surface 424-1 of the second optical component 424 is substantially collimated.

In configurations in which the first reflective polarizer 422-1 has a curved profile, the first reflective polarizer 422-1 changes a divergence of the second illumination light 492 (e.g., substantially collimate the second illumination light 492). For example, the second illumination light 492 output from the second light source 410-2 has a first divergence profile (e.g., the second illumination light 492 is diverging) and the second illumination light 492, after reflection at the first reflective polarizer 422-1, has a second divergence profile (e.g., the second illumination light 492 is substantially collimated) that is different from the first divergence profile. In some embodiments, the second illumination light 492 transmitted through the optical surface 424-1 of the second optical component 424 is substantially collimated.

The optical assembly 420 may include any combination of the embodiments described with respect to FIGS. 4D-4G. For example, the first optical retarder 422-2 may disposed between the first set of one or more substrates 460 and the second optical component 424, and the second reflective polarizer 426-1 and the second optical retarder 426-2 may be coatings on the third surface 424-3 of the second optical component 424. Additionally, the third surface 424-3 of the second optical component 424 may be curved (e.g., have a concave or convex surface profile).

FIGS. 4H and 4I illustrate illumination assemblies in accordance with some embodiments.

FIG. 4H shows an illumination assembly 402, which is similar to illumination assembly 400 shown in FIG. 4A. The illumination assembly 402 includes one or more light sources 410 (e.g., first light source 410-1 and second light source 410-2), the optical assembly 420, a spatial light modulator 430, a beam splitter 440, and an output assembly 450. The illumination light 494 is output from the one or more light sources 410 and is directed toward the beam splitter 440 via optical assembly 420, as described above with respect to FIG. 4B. The beam splitter 440 is configured to receive the illumination light 494 output from the optical assembly 420 and to transmit the illumination light 494 toward the spatial light modulator 430. The spatial light modulator 430 is configured to receive the illumination light 494, modulate at least a portion of the illumination light 494, and output modulated light 496 toward the beam splitter 440. The beam splitter 440 is configured to receive the modulated light 496 and reflect the modulated light 496 toward the output assembly 450. The output assembly 450 is configured to receive the modulated light 496 and transmit at least a portion of the modulated light 496. In some embodiments, the output assembly 450 is configured to transmit or project at least a portion of the modulated light 496 toward an eye of a user. In some embodiments, the output assembly 450 may include display optics (e.g., lens 452) or a waveguide with an optical input coupler. For example, the output assembly 450 may include any of: a focusing optical element (e.g., collimating lens), a projector, and a refractive optical element.

FIG. 4I shows an illumination assembly 404, which is similar to illumination assembly 402 shown in FIG. 4H, except that the position of the spatial light modulator 430 and the propagation directions of the rays are different. The illumination light 494 is output from the one or more light sources 410 and is directed toward the beam splitter 440 via optical assembly 420, as described above with respect to FIG. 4B. The beam splitter 440 is configured to receive the illumination light 494 output from the optical assembly 420 and to reflect the illumination light 494 toward the spatial light modulator 430. The spatial light modulator 430 is configured to receive the illumination light 494, modulate at least a portion of the illumination light 494, and output modulated light 496 toward the beam splitter 440. The beam splitter 440 is configured to receive the modulated light 496 and transmit the modulated light 496 toward the output assembly 450. The output assembly 450 is configured to receive the modulated light 496 and transmit at least a portion of the modulated light 496. In some embodiments, the output assembly 450 may be configured to project at least a portion of the modulated light 496.

As shown in FIGS. 4H and 4I, the illumination light 494 may include any of the first illumination light 490 output from the first light source 410-1 and the second illumination light 492 output from the second light source 410-2.

FIGS. 5A-5D are flow diagrams illustrating a method 500 of illuminating a spatial light modulator in accordance with some embodiments. The method 500 includes (operation 510) outputting first illumination light 490 from a first light source 410-1; (operation 520) receiving the first illumination light 490 at a first optical component 422; and (operation 530) transmitting, though the first optical component 422, the first illumination light 490 toward a second optical component 424. The method 500 also includes (operation 540) reflecting, at the second optical component 424, the first illumination light 490 toward a third optical component 426; (operation 550) reflecting, at the third optical component 426, the first illumination light 490 toward the second optical component 424; (operation 560) transmitting, through the second optical component, the first illumination light toward a spatial light modulator; and (operation 570) receiving, at the spatial light modulator 430, the first illumination light 490 output from the second optical component 424.

In some embodiments, the first optical component 422 also includes a first optical retarder 422-2. The method 500 also includes (operation 522) receiving the first illumination light 490 at a first reflective polarizer 422-1 of the first optical component 422; (operation 532) transmitting, through the first reflective polarizer 422-1, the first illumination light 490 having a first polarization; and transmitting, through the first optical retarder 422-2, the first illumination light 490 toward the second optical component 424 while converting the polarization of the first illumination light 490 from the first polarization to a second polarization that is different from the first polarization. The method 500 may also include (operation 542) reflecting the first illumination light 490 having the second polarization via total internal reflection at an optical surface 424-1 of the second optical component 424. The first illumination light 490 that is reflected at the optical surface 424-1 has a third polarization that is different from (e.g., orthogonal to) the second polarization. The method 500 further includes (operation 552) transmitting, through a second optical retarder 426-2 of the third optical component 426, the first illumination light 490 while converting the polarization of the first illumination light 490 from the third polarization to a fourth polarization that is different from each of the first polarization, the second polarization, and the third polarization; reflecting the first illumination light 490 having the fourth polarization at the second reflective polarizer 426-1; and transmitting, through the second optical retarder 426-2, the first illumination light 490 having the fourth polarization toward the second optical component 424 while converting the polarization of the first illumination light 490 from the fourth polarization to the third polarization. In some embodiments, the fourth polarization is orthogonal to the first polarization. The method 500 may further include (operation 562) transmitting the first illumination light 490 having the third polarization through the optical surface 424-1 of the second optical component 424. In some embodiments, at least a portion of the first illumination light 490 is lost as the first illumination light 490 is transmitted through or reflected at each optical element (e.g., reflective polarizers 422-1 and 426-1, optical retarders 422-2 and 426-2, and optical surface 424-1).

In some embodiments, (operation 544) the second reflective polarizer 426-1 has a concave surface profile and reflecting the first illumination light 490 at the second reflective polarizer 426-1 includes changing a divergence of the first illumination light 490 (e.g., substantially collimating the first illumination light 490).

In some embodiments, the method 500 further includes (operation 580) outputting second illumination light 492 from a second light source 410-2; receiving the second illumination light 492 at the third optical component 426; transmitting, through the third optical component 426, the second illumination light 492 toward the second optical component 424; and reflecting, at the second optical component 424, the second illumination light 492 toward the first optical component 422. The method 500 also includes reflecting, at the first optical component 422, the second illumination light 490-2 toward the second optical component 424; transmitting, through the second optical component 424, the second illumination light 492 toward the spatial light modulator 430; and receiving, at the spatial light modulator 430, the second illumination light 492 output from the second optical component 424.

In some embodiments, the method 500 also includes (operation 590) modulating, with the spatial light modulator 430, at least a portion of the first illumination light 490 received by the spatial light modulator 430; and outputting, from the spatial light modulator 430, the modulated light 496.

In some embodiments, the method 500 further includes (operation 592) receiving, at a beam splitter 440, the first illumination light 490 transmitted through the second optical component 424; providing, with the beam splitter 440, the first illumination light 490 in a first direction toward the spatial light modulator 430; receiving, with the beam splitter 440, the modulated light 496 output from the spatial light modulator 430; and providing, with the beam splitter 440, the modulated light 496 in a second direction that is non-parallel to the first direction.

In some embodiments, the method 500 also includes (operation 594) receiving, at an output assembly 450, the modulated light 496 output from the spatial light modulator 430. The method 500 also includes projecting at least a portion of the modulated light 496 from the output assembly 450.

In light of these principles, we now turn to certain embodiments of display devices.

In accordance with some embodiments, an illumination assembly (e.g., illumination assembly 400, 402, or 404) includes a first light source (e.g., light source 410) and an optical assembly (e.g., optical assembly 420). The light source is configured to provide first illumination light (e.g., first illumination light 490). The optical assembly includes a first optical component (e.g., first optical component 422), a second optical component (e.g., second optical component 424), and a third optical component (e.g., third optical component 426). The light source, the first optical component, the second optical component, and the third optical component are positioned relative to one another so that the first illumination light is (i) received by at the first optical component, (ii) is transmitted through the first optical component toward the second optical component, (iii) is reflected at the second optical component toward the third optical component, (iv) is reflected at the third optical component toward the second optical component, and (v) is transmitted through the second optical component.

In some embodiments, the first optical component (e.g., first optical component 422) includes a first reflective polarizer (e.g., first reflective polarizer 422-1) and a first optical retarder (e.g., first optical retarder 422-2) so that the first illumination light (e.g., first illumination light 490) provided by the first light source (e.g., first light source 410-1) is transmitted through the first reflective polarizer before being transmitted through the first optical retarder. The second component (e.g., second optical component 424) includes an optical surface (e.g., optical surface 424-1) so that the first illumination light transmitted through the first optical component is reflected via total internal reflection at the optical surface of the second optical component toward the third optical component (e.g., third optical component 426). The optical component includes a second reflective polarizer (e.g., second reflective polarizer 426-1 and a second optical retarder (e.g., second optical retarder 426-2) so that the first illumination light (e.g., first illumination light 490) reflected at the optical surface of the second optical component is transmitted through the second optical retarder before being reflected at the second reflective polarizer.

In some embodiments, the optical surface (e.g., optical surface 424-1) of the second optical component (e.g., second optical component 424) does not include a coating.

In some embodiments, the second optical component includes at least a first surface (e.g., first surface 424-1 corresponding to the optical surface 424-1), a second surface (e.g., second surface 424-2) that is non-parallel to the first surface, and a third surface (e.g., third surface 424-3) that is non-parallel to the first surface and the second surface. The first optical retarder (e.g., first optical retarder 422-2) is disposed on the first surface of the second optical component and the second optical retarder (e.g., second optical retarder 426-2) is disposed on the third surface of the second optical component.

In some embodiments, the second optical component (e.g., second optical component 424) has a refractive index that is different from (e.g., greater than) a refractive index of air.

In some embodiments, the first reflective polarizer (e.g., first reflective polarizer 422-1) is disposed on the second surface (e.g., second surface 424-2) of the second optical component (e.g., second optical component 424) and the second reflective polarizer (e.g., second reflective polarizer 426-1) is disposed on the third surface (e.g., third surface 424-3) of the second optical component.

In some embodiments, the optical assembly (e.g., optical assembly 420) also includes a first set of one or more substrates (e.g., first set of one or more substrates 460) and a second set of one or more substrates (e.g., second set of one or more substrates 462) so that the first optical retarder (e.g., first optical retarder 422-2) is disposed between the first set of one or more substrates and the second optical component (e.g., second optical component 424) and the second optical retarder (e.g., second optical retarder 426-2) is disposed between the second set of one or more substrates and the second optical component.

In some embodiments, the first reflective polarizer (e.g., first reflective polarizer 422-1) is disposed between the first set of one or more substrates (e.g., first set of one or more substrates 460) and the second optical component (e.g., second optical component 424) and the second reflective polarizer (e.g., second reflective polarizer 426-1) is disposed between the second set of one or more substrates (e.g., second set of one or more substrates 462) and the second optical component.

In some embodiments, the second optical component (e.g., second optical component 424) includes at least a first surface (e.g., first surface 424-1 corresponding to the optical surface 424-1), a second surface (e.g., second surface 424-2) that is non-parallel to the first surface, and a third surface (e.g., third surface 424-3) that is non-parallel to the first surface and the second surface. The first surface and the second surface form a first angle (e.g., first angle θ1) and the third surface and the second surface form a second angle (e.g., second angle θ2) that is equal to the first angle (e.g., θ1=θ2).

In some embodiments, the second reflective polarizer (e.g., second reflective polarizer 426-1) has a concave surface profile such that the second reflective polarizer is configured to change a divergence (e.g., substantially collimate, add an optical power) of the first illumination light (e.g., first illumination light 490).

In some embodiments, the illumination assembly (e.g., illumination assembly 400, 402, 404) further includes a second light source (e.g., second light source 410-2) that is configured to provide second illumination light (e.g., second illumination light 492). The second light source is positioned relative to the optical assembly (e.g., optical assembly 420) so that the second illumination light is: (i) received by the optical assembly at the third optical component (e.g., third optical component 426), (ii) transmitted through the third optical component toward the second optical component (e.g., second optical component 424), (iii) reflected at the second optical component toward the first optical component (e.g., first optical component 422), (iv) reflected at the first optical component toward the second optical component, and (v) transmitted through the second optical component.

In some embodiments, the second illumination light (e.g., second illumination light 492) provided by the second light source (e.g., second light source 410-2) is: (i) transmitted through the second reflective polarizer (e.g., second reflective polarizer 426-1), (ii) transmitted through the second optical retarder (e.g., second optical retarder 426-2) toward the second optical component (e.g., second optical component 424), (iii) reflected via total internal reflection at the optical surface (e.g., optical surface 424-1) of the second optical component (e.g., second optical component 424) toward the first optical component (e.g., first optical component 422), (v) transmitted through the first optical retarder (e.g., first optical retarder 422-2), (vi) reflected at the first reflective polarizer (e.g., first reflective polarizer 422-1), (vii) transmitted through the first optical retarder toward the second optical component, and (viii) transmitted through the second optical component. In some embodiments, the spatial light modulator is positioned (e.g., configured) to receive the second illumination light provided by the second light source.

In some embodiments, the first reflective polarizer (e.g., first reflective polarizer 422-1) has a concave surface profile such that the first reflective polarizer is configured to change a divergence (e.g., substantially collimate, add an optical power) of the second illumination light (e.g., second illumination light 492).

In some embodiments, the illumination assembly includes a spatial light modulator (e.g., spatial light modulator 430) that is configured to receive the first illumination light (e.g., first illumination light 490, which is included as part of illumination light 494) output from the optical assembly (e.g., optical assembly 420), modulate at least a portion of the received first illumination light, and output modulated light (e.g., modulated light 496) toward the optical assembly. The modulated light includes a portion of the first illumination light that is modulated by the spatial light modulator.

In some embodiments, the illumination assembly includes a spatial light modulator (e.g., spatial light modulator 430) that is configured to receive the second illumination light (e.g., second illumination light 492, which is included as part of illumination light 494) output from the optical assembly (e.g., optical assembly 420), modulate at least a portion of the received second illumination light, and output modulated light (e.g., modulated light 496) toward the optical assembly. The modulated light includes a portion of the second illumination light that is modulated by the spatial light modulator.

In some embodiments, the modulated light (e.g., modulated light 496) corresponds to one or more images to be displayed.

In some embodiments, the illumination assembly (e.g., illumination assembly 400, 402, 404) further includes a beam splitter (e.g., beam splitter 440) that is disposed between the second optical component (e.g., second optical component 424) of the optical assembly (e.g., optical assembly 420) and a spatial light modulator (e.g., spatial light modulator 430). The beam splitter is positioned (e.g., configured) to: (i) provide the first illumination light (e.g., first illumination light 490, which is included as part of illumination light 494) in a first direction toward the spatial light modulator, (ii) receive the modulated light (e.g., modulated light 496) output from the spatial light modulator, and (iii) provide the modulated light in a second direction toward an output assembly (e.g., output assembly 450). The second direction is non-parallel to the first direction. The spatial light modulator is positioned to receive the first illumination light output from the optical assembly.

In some embodiments, the beam splitter is also positioned (e.g., configured) to: (i) provide the second illumination light (e.g., second illumination light 492, which is included as part of illumination light 494) in a first direction toward the spatial light modulator (e.g., spatial light modulator 430), (ii) receive the modulated light (e.g., modulated light 496) output from the spatial light modulator, and (iii) provide the modulated light in a second direction toward an output assembly (e.g., output assembly 450). The second direction is non-parallel to the first direction.

In some embodiments, the illumination assembly (e.g., illumination assembly 400, 402, 404) further includes an output assembly (e.g., output assembly 450) that is configured to receive the modulated light (e.g., modulated light 496) output from the spatial light modulator (e.g., spatial light modulator 430).

In some embodiments, the first light source (e.g., light source 410-1) includes a first plurality of light emitting elements and a respective lighting element of the first plurality of light emitting elements is individually activatable. Thus, portions of the spatial light modulator (e.g., spatial light modulator 430) can be selectively illuminated (e.g., zonal illumination to reduce loss and improve efficiency).

In some embodiments, the second light source (e.g., light source 410-1) includes a second plurality of light emitting elements and a respective lighting element of the second plurality of light emitting elements is individually activatable. Thus, portions of the spatial light modulator (e.g., spatial light modulator 430) can be selectively illuminated (e.g., zonal illumination to reduce loss and improve efficiency).

In some embodiments, the illumination assembly is a reflective spatial light modulator (e.g., LCoS) that is positioned to receive the first illumination light output from the optical assembly.

In accordance with some embodiments a method (e.g., method 500) includes outputting first illumination light (e.g., first illumination light 490) from a first light source (e.g., light source 410-1); receiving the first illumination light at a first optical component (e.g., first optical component 422); transmitting, through the first optical component, the first illumination light toward a second optical component (e.g., second optical component 424); reflecting, at the second optical component, the first illumination light toward a third optical component (e.g., third optical component 426); reflecting, at the third optical component, the first illumination light toward the second optical component; transmitting, through the second optical component, the first illumination light toward a spatial light modulator (e.g., spatial light modulator 430); and receiving, at the spatial light modulator, the first illumination light output from the second optical component.

In some embodiments, the first illumination light (e.g., first illumination light 490) impinges on the third optical component (e.g., third optical component 426) in a direction that is not normal to the third optical component.

In some embodiments, receiving the first illumination light (e.g., first illumination light 490) at the first optical component (e.g., first optical component 422) includes receiving the first illumination light at a first reflective polarizer (e.g., first reflective polarizer 422-1) of the first optical component. The first optical component also includes a first optical retarder (e.g., first optical retarder 422-2). In some embodiments, transmitting the first illumination light through the first optical component toward the second optical component (e.g., second optical component 424) includes: (i) transmitting, through the first reflective polarizer, the first illumination light having a first polarization; and (ii) subsequently to transmitting the first illumination light having the first polarization through the first reflective polarizer, transmitting, through the first optical retarder, the first illumination light toward the second optical component while converting the polarization of the first illumination light from the first polarization to a second polarization that is different from the first polarization. In some embodiments, reflecting the first illumination light at the second optical component toward the third optical component (e.g., third optical component 426) includes reflecting the first illumination light having the second polarization via total internal reflection at an optical surface (e.g., optical surface 424-1) of the second optical component. The first illumination light that is reflected at the optical surface has a third polarization that is different from (e.g., orthogonal to) the second polarization. In some embodiments, reflecting the first illumination light at the third optical component toward the second optical component includes: (iii) transmitting, through a second optical retarder (e.g., second optical retarder 426-2) of the third optical component, the first illumination light while converting the polarization of the first illumination light from the third polarization to a fourth polarization; (iv) reflecting the first illumination light having the fourth polarization at a second reflective polarizer (e.g., second reflective polarizer 426-1); and (v) transmitting, through the second optical retarder, the first illumination light having the fourth polarization toward the second optical component while converting the polarization of the first illumination light from the fourth polarization to the third polarization. The fourth polarization i different from each of the first polarization, the second polarization, and the third polarization. In some embodiments, the fourth polarization is orthogonal to the first polarization. In some embodiments, transmitting, through the second optical component, the first illumination light having the third polarization toward a spatial light modulator (e.g., spatial light modulator 430) includes transmitting the first illumination light having the third polarization through the optical surface of the second optical component.

In some embodiments, the second reflective polarizer (e.g., second reflective polarizer 426-1) has a concave surface profile, and reflecting the first illumination light (e.g., first illumination light 490) at the second reflective polarizer includes changing a divergence (e.g., collimating, adding an optical power) of the first illumination light.

In some embodiments, the method (e.g., method 500) further includes outputting second illumination light (e.g., second illumination light 492) from a second light source (e.g., light source 410-2); receiving the second illumination light at the third optical component (e.g., third optical component 426); transmitting, through the third optical component, the second illumination light toward the second optical component (e.g., second optical component 424); and reflecting, at the second optical component, the second illumination light toward the first optical component (e.g., first optical component 422). The method also includes reflecting, at the first optical component, the second illumination light toward the second optical component; transmitting, through the second optical component, the second illumination light toward the spatial light modulator (e.g., spatial light modulator 430); and receiving, at the spatial light modulator, the second illumination light output from the second optical component.

In some embodiments, the method (e.g., method 500) further includes modulating, with the spatial light modulator (e.g., spatial light modulator 430), at least a portion of the first illumination light (e.g., first illumination light 490) received by the spatial light modulator; and outputting, from the spatial light modulator, modulated light (e.g., modulated light 496).

In some embodiments, the method (e.g., method 500) further includes receiving, at a beam splitter (e.g., beam splitter 440), the first illumination light (e.g., first illumination light 490) transmitted through the second optical component (e.g., second optical component 424); and providing, with the beam splitter, the first illumination light in a first direction toward the spatial light modulator (e.g., spatial light modulator 430). The method also includes receiving, with the beam splitter, the modulated light (e.g., modulated light 496) output from the spatial light modulator; and providing, with the beam splitter, the modulated light in a second direction that is non-parallel to the first direction.

In some embodiments, the method (e.g., method 500) further includes receiving, at an output assembly (e.g., output assembly 450), the modulated light (e.g., modulated light 496) output from the spatial light modulator (e.g., spatial light modulator 430). The method also includes projecting at least a portion of the modulated light 496 from the output assembly.

In some embodiments, the method (e.g., method 500) further includes reflecting, by the spatial light modulator (e.g., spatial light modulator 430), a subset, less than all, of the first illumination light (e.g., first illumination light 490) as the modulated light (e.g., modulated light 496).

In some embodiments, the method (e.g., method 500) also includes reflecting, by the spatial light modulator (e.g., spatial light modulator 430), a subset, less than all, of the second illumination light (e.g., second illumination light 492) as the modulated light (e.g., modulated light 496).

In some embodiments, the first light source (e.g., light source 410-1) includes a plurality of light emitting elements and the method (e.g., method 500) further includes activating a subset, less than all, of the plurality of light emitting elements of the first light source.

In some embodiments, the second light source (e.g., light source 410-2) includes a plurality of light emitting elements and the method (e.g., method 500) further includes activating a subset, less than all, of the plurality of light emitting elements of the second light source.

In some embodiments, a respective lighting element of the plurality of light emitting elements is individually activatable and is configured to illuminate a corresponding portion, less than all, of the spatial light modulator (e.g., spatial light modulator 430). Thus, portions of the spatial light modulator can be selectively illuminated (e.g., zonal illumination to reduce loss and improve efficiency).

In some embodiments, a light source (e.g., light source 410-1 and/or 410-2) may be configured to provide (e.g., output, emit, generate) polychromatic light, such as broadband light or "white" light. Alternatively, the light source may be configured to provide (e.g., output, emit, generate) monochromatic light (e.g., light having a primarily or dominantly blue color).

In accordance with some embodiments, a display device (e.g., display device 300) includes an illumination assembly (e.g., illumination assembly 400, 402, or 404) that includes a first light source (e.g., light source 410), an optical assembly (e.g., optical assembly 420), and a spatial light modulator (e.g., spatial light modulator 430). The light source is configured to provide first illumination light (e.g., first illumination light 490). The optical assembly includes a first optical component (e.g., first optical component 422), a second optical component (e.g., second optical component 424), and a third optical component (e.g., third optical component 426). The light source, the first optical component, the second optical component, and the third optical component are positioned relative to one another so that the first illumination light is (i) received by at the first optical component, (ii) is transmitted through the first optical component toward the second optical component, (iii) is reflected at the second optical component toward the third optical component, (iv) is reflected at the third optical component toward the second optical component, and (v) is transmitted through the second optical component. The spatial light modulator is positioned to receive the first illumination light output from the optical assembly.

Although various drawings illustrate operations of particular components or particular groups of components with respect to one eye, a person having ordinary skill in the art would understand that analogous operations can be performed with respect to the other eye or both eyes. For brevity, such details are not repeated herein.

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. An illumination assembly, comprising:
    a first light source configured to provide first illumination light; and
    an optical assembly including a first optical component, a second optical component, and a third optical component, wherein:
        the first optical component, the second optical component, and the third optical component are positioned relative to one another and to the first light source so that the first illumination light is (i) received by the first optical component, (ii) is transmitted through the first optical component toward the second optical component, (iii) is reflected at the second optical component toward the third optical component, (iv) is reflected at the third optical component toward the second optical component, and (v) is transmitted through the second optical component;
        the first optical component includes a first reflective polarizer and a first optical retarder so that the first illumination light provided by the first light source is transmitted through the first reflective polarizer before being transmitted through the first optical retarder;
        the second optical component includes an optical surface so that the first illumination light transmitted through the first optical component is reflected at the optical surface of the second optical component toward the third optical component; and
        the third optical component includes a second reflective polarizer and a second optical retarder so that the first illumination light reflected at the optical surface of the second optical component is transmitted through the second optical retarder before being reflected at the second reflective polarizer.

2. The illumination assembly of claim 1, wherein:
    the second optical component includes at least a first surface, a second surface non-parallel to the first surface, and a third surface non-parallel to the first surface and the second surface;
    the first optical retarder is disposed on the first surface of the second optical component; and
    the second optical retarder is disposed on the third surface of the second optical component.

3. The illumination assembly of claim 2, wherein:
    the optical assembly also includes a first set of one or more substrates and a second set of one or more substrates so that the first optical retarder is disposed between the first set of one or more substrates and the second optical component and the second optical retarder is disposed between the second set of one or more substrates and the second optical component.

4. The illumination assembly of claim 1 wherein:
    the second optical component includes at least a first surface, a second surface non-parallel to the first surface, and a third surface non-parallel to the first surface and the second surface;
    the first surface and the second surface form a first angle; and
    the third surface and the second surface form a second angle equal to the first angle.

5. The illumination assembly of claim 1, wherein:
    the second reflective polarizer has a concave surface profile.

6. The illumination assembly of claim 1, further comprising:
    a second light source configured to provide second illumination light, the second light source being positioned relative to the optical assembly so that the second illumination light is (i) received by the third optical component, (ii) is transmitted through the third optical component toward the second optical component, (iii) is reflected at the second optical component toward the first optical component, (iv) is reflected at the first optical component toward the second optical component, and (v) is transmitted through the second optical component.

7. The illumination assembly of claim 6, wherein:
    the first reflective polarizer has a concave surface profile.

8. The illumination assembly of claim 1, further comprising:
    a spatial light modulator positioned to receive the first illumination light output from the optical assembly, the spatial light modulator being configured to:
        receive the first illumination light output from the optical assembly;
        modulate at least a portion of the received first illumination light; and
        output modulated light toward the optical assembly.

9. The illumination assembly of claim 8, further comprising:
    a beam splitter disposed between the optical assembly and the spatial light modulator so that the beam splitter receives the first illumination light output from the optical assembly and provides the first illumination light in a first direction toward the spatial light modulator, and the beam splitter receives the modulated light output from the spatial light modulator and provides the modulated light in a second direction, non-parallel to the first direction, toward an output assembly.

10. The illumination assembly of claim 9, further comprising an output assembly configured to receive the modulated light output from the spatial light modulator.

11. The illumination assembly of claim 1, wherein:
the first light source includes a plurality of light emitting elements; and
a respective light emitting element of the plurality of light emitting elements is individually activatable.

12. The illumination assembly of claim 1, further comprising a reflective spatial light modulator positioned to receive the first illumination light output from the optical assembly.

13. A method, comprising:
outputting first illumination light from a first light source;
receiving the first illumination light at a first optical component;
transmitting, through the first optical component, the first illumination light toward a second optical component;
reflecting, at the second optical component, the first illumination light toward a third optical component;
reflecting, at the third optical component, the first illumination light toward the second optical component;
transmitting, through the second optical component, the first illumination light toward a spatial light modulator; and
receiving, at the spatial light modulator, the first illumination light output from the second optical component, wherein:
receiving the first illumination light at the first optical component includes receiving the first illumination light at a first reflective polarizer of the first optical component, the first optical component further including a first optical retarder;
transmitting the first illumination light through the first optical component toward the second optical component includes:
transmitting, through the first reflective polarizer, the first illumination light having a first polarization; and
transmitting, through the first optical retarder, the first illumination light toward the second optical component while converting the polarization of the first illumination light from the first polarization to a second polarization different from the first polarization;
reflecting the first illumination light at the second optical component toward the third optical component includes:
reflecting the first illumination light having the second polarization via total internal reflection at an optical surface of the second optical component, the first illumination light reflected at the optical surface having a third polarization different from the second polarization;
reflecting the first illumination light at the third optical component toward the second optical component includes:
transmitting, through a second optical retarder of the third optical component, the first illumination light while converting the polarization of the first illumination light from the third polarization to a fourth polarization different from the first polarization, the second polarization, and the third polarization,
reflecting the first illumination light having the fourth polarization at a second reflective polarizer; and
transmitting, through the second optical retarder, the first illumination light having the fourth polarization toward the second optical component while converting the polarization of the first illumination light from the fourth polarization to the third polarization; and
transmitting, through the second optical component, the first illumination light having the third polarization toward a spatial light modulator includes:
transmitting the first illumination light having the third polarization through the optical surface of the second optical component.

14. The method of claim 13, wherein:
the second reflective polarizer has a concave surface profile; and
reflecting the first illumination light at the second reflective polarizer includes changing a divergence of the first illumination light.

15. The method of claim 13, further comprising:
outputting second illumination light from a second light source;
receiving the second illumination light at the third optical component;
transmitting, through the third optical component, the second illumination light toward the second optical component;
reflecting, at the second optical component, the second illumination light toward the first optical component;
reflecting, at the first optical component, the second illumination light toward the second optical component;
transmitting, through the second optical component, the second illumination light toward the spatial light modulator; and
receiving, at the spatial light modulator, the second illumination light output from the second optical component.

16. The method of claim 13, further comprising:
modulating, with the spatial light modulator, at least a portion of the first illumination light received by the spatial light modulator; and
outputting, from the spatial light modulator, modulated light.

17. The method of claim 16, further comprising:
receiving, at a beam splitter, the first illumination light transmitted through the second optical component;
providing, with the beam splitter, the first illumination light in a first direction toward the spatial light modulator;
receiving, with the beam splitter, the modulated light output from the spatial light modulator; and
providing, with the beam splitter, the modulated light in a second direction that is non-parallel to the first direction.

18. The method of claim 16, further comprising:
receiving, at an output assembly, the modulated light output from the spatial light modulator; and
projecting, from the output assembly, at least a portion of the modulated light.

\* \* \* \* \*